United States Patent
Dorner et al.

(10) Patent No.: US 12,305,558 B2
(45) Date of Patent: May 20, 2025

(54) EXHAUST GAS TREATMENT SYSTEM INCLUDING A MULTIFUNCTIONAL CATALYST

(71) Applicant: BASF MOBILE EMISSIONS CATALYSTS LLC, Iselin, NJ (US)

(72) Inventors: Robert Dorner, Hannover (DE); Tobias Paul, Hannover (DE); Edgar Viktor Huennekes, Hannover (DE); Jan Martin Becker, Hannover (DE); Kevin Beard, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 0 days.

(21) Appl. No.: 18/265,482

(22) PCT Filed: Dec. 8, 2021

(86) PCT No.: PCT/EP2021/084732
§ 371 (c)(1),
(2) Date: Jun. 6, 2023

(87) PCT Pub. No.: WO2022/122798
PCT Pub. Date: Jun. 16, 2022

(65) Prior Publication Data
US 2024/0035407 A1    Feb. 1, 2024

(30) Foreign Application Priority Data
Dec. 8, 2020   (EP) .................................. 20212508

(51) Int. Cl.
*F01N 3/28* (2006.01)
*F01N 3/20* (2006.01)
*F01N 13/00* (2010.01)

(52) U.S. Cl.
CPC ......... *F01N 3/2803* (2013.01); *F01N 3/2066* (2013.01); *F01N 13/0097* (2014.06);
(Continued)

(58) Field of Classification Search
CPC combination set(s) only.
See application file for complete search history.

(56) References Cited

U.S. PATENT DOCUMENTS

2004/0101452 A1   5/2004   LaBarge et al.
2005/0137079 A1   6/2005   LaBarge
(Continued)

FOREIGN PATENT DOCUMENTS

WO   2018/224651 A2   12/2018
WO   2019211277 A     11/2019

OTHER PUBLICATIONS

International Preliminary Report on Patentability and Written Opinion from corresponding PCT International Application No. PCT/EP2021/084732 dated Jun. 22, 2023.
International Search Report and Written Opinion from corresponding PCT International Application No. PCT/EP2021/084732 dated Apr. 14, 2022.

*Primary Examiner* — Binh Q Tran
(74) *Attorney, Agent, or Firm* — DLA Piper LLP (US)

(57) ABSTRACT

The present invention relates to an exhaust gas treatment system for treating an exhaust gas stream exiting a diesel engine, wherein said exhaust gas treatment system comprises a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron; a second catalyst having an inlet end and an outlet end and comprising a coating disposed on a substrate, wherein the coating comprises one or more of a vanadium oxide and a zeolitic material com-
(Continued)

Exhaust gas flow prising one or more of copper and iron, wherein at most 0.0001 weight-% of the coating of the second catalyst consists of platinum group metal.

15 Claims, 5 Drawing Sheets

(52) U.S. Cl.
CPC ............... *B01D 2255/1021* (2013.01); *B01D 2255/20707* (2013.01); *B01D 2255/20738* (2013.01); *B01D 2255/20761* (2013.01); *F01N 2370/02* (2013.01); *F01N 2370/04* (2013.01); *F01N 2370/24* (2013.01); *F01N 2510/063* (2013.01); *F01N 2510/0684* (2013.01)

(56) References Cited

U.S. PATENT DOCUMENTS

| | | | |
|---|---|---|---|
| 2013/0089481 A1* | 4/2013 | Sumiya | B01J 29/7007 60/299 |
| 2015/0360178 A1* | 12/2015 | Kalwei | B01J 29/7015 502/79 |
| 2018/0111086 A1* | 4/2018 | Chen | B01D 53/9436 |
| 2020/0230582 A1* | 7/2020 | Patchett | B01J 35/40 |
| 2021/0069688 A1* | 3/2021 | Patchett | B01D 53/944 |
| 2021/0079826 A1* | 3/2021 | Voss | F01N 3/2066 |
| 2021/0387145 A1* | 12/2021 | Maurer | B01J 35/638 |

* cited by examiner

EXHAUST GAS TREATMENT SYSTEM INCLUDING A MULTIFUNCTIONAL CATALYST

The present invention relates to an exhaust gas treatment system for treating an exhaust gas stream exiting a diesel engine and a method for the treatment of an exhaust gas stream exiting a diesel engine using said system.

It is a known problem that close coupled selective catalytic reduction (SCR) catalysts based on copper containing zeolitic material having a framework structure of the type CHA, may be sulfated with time even though there is no upstream oxidation catalyst due to the sulfur trioxide exiting from engine and internally generated by SCR catalysts. Here, the term "close coupled" catalyst is used herein to define a catalyst which is the first catalyst receiving the exhaust gas stream exiting from an engine. Accordingly, it results that close coupled SCR catalysts are not able to provide sufficient DeNOx to meet the Ultra-low nitrogen oxides (NOx) and nitrous oxide ($N_2O$) emissions, such as CARB after sulfation.

WO 2018/224651 A1 discloses different exhaust gas treatment systems in order to meet the Ultra-low nitrogen oxides (NOx) and nitrous oxide ($N_2O$) emissions, such as CARB after sulfation regeneration. However, there is still a need for further reducing nitrous oxides emissions while maintaining or increasing DeNOx.

Therefore, it was an object of the present invention to provide an exhaust gas treatment system for treating an exhaust gas stream exiting a diesel engine which prevents sulfating in order to maintain sufficient DeNOx, to meet the environmental requirements, and greatly reduce nitrous oxide emissions.

Surprisingly, it was found that the exhaust gas treatment system for treating an exhaust gas stream leaving a diesel engine according to the present invention and described in the following permits the regeneration after sulfating in order to maintain sufficient DeNOx or even increasing DeNOx, to meet the environmental requirements, as well as to greatly reduce the nitrous oxide emissions.

Therefore, the present invention relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron;

(ii) a second catalyst having an inlet end and an outlet end and comprising a coating disposed on a substrate, wherein the coating comprises one or more of a vanadium oxide and a zeolitic material comprising one or more of copper and iron, wherein at most 0.0001 weight-% of the coating of the second catalyst consists of platinum group metal;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

First Catalyst

It is preferred that the outlet end of the first catalyst according to (i) is in fluid communication with the inlet end of the second catalyst according to (ii) and that between the outlet end of the first catalyst according to (i) and the inlet end of the second catalyst according to (ii), no catalyst for treating the exhaust gas stream exiting the first catalyst is located in the exhaust gas treatment system.

Preferably from 70 to 98 weight-%, more preferably from 75 to 95 weight-%, more preferably from 80 to 90 weight-% of the oxidic material comprised in the coating of the first catalyst according to (i) consist of zirconium and oxygen, preferably of zirconia.

Preferably the oxidic material comprised in the coating of the first catalyst according to (i) further comprises one or more of lanthanum, hafnium, aluminum, silicon and titanium, more preferably one or more of lanthanum and hafnium, more preferably lanthanum and hafnium.

Preferably from 95 to 100 weight-%, more preferably from 99 to 100 weight-%, more preferably from 99.5 to 100 weight-% of the oxidic material comprised in the coating of the first catalyst according to (i) consist of oxygen, zirconium, lanthanum and hafnium. More preferably from 1.5 to 15 weight-%, more preferably from 5 to 15 weight-%, of the oxidic material consist of lanthanum, calculated as $La_2O_3$, and more preferably from 0.5 to 15 weight-%, more preferably from 1 to 5 weight-%, of the oxidic material consist of hafnium, calculated as $HfO_2$.

Preferably from 5 to 40 weight-%, more preferably from 7 to 20 weight-%, more preferably from 8 to 15 weight-%, of the coating of the first catalyst according to (i) consist of the oxidic material.

As to the coating of the first catalyst, it is preferred that it comprises palladium at a loading, calculated as elemental Pd, in the range of from 1 to 80 $g/ft^3$, more preferably in the range of from 5 to 50 $g/ft^3$, more preferably in the range of from 7.5 to 40 $g/ft^3$, more preferably in the range of from 10 to 20 $g/ft^3$.

It is preferred that the coating of the first catalyst according to (i) comprises the zeolitic material comprising one or more of copper and iron, wherein from 60 to 95 weight-%, more preferably from 80 to 93 weight-%, more preferably from 82 to 92 weight-%, of the coating of the first catalyst according to (i) consist of the zeolitic material comprising one or more of copper and iron.

As to the zeolitic material comprised in the coating of the first catalyst, it is preferred that said zeolitic material has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

Preferably the zeolitic material comprised in the coating of the first catalyst, more preferably having a framework structure type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the zeolitic material comprised in the coating of the first catalyst comprises copper, wherein the amount of copper comprised in the zeolitic material, calculated as CuO, is more preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the weight of the zeolitic material. It is more preferred that the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the weight of the zeolitic material.

It is preferred that the zeolitic material has a framework structure of the type CHA and comprises copper, more preferably in the amount disclosed above.

Preferably from 95 to 100 weight-%, more preferably from 98 to 100 weight-%, more preferably from 99 to 100 weight-%, of the framework structure of the zeolitic material of the coating of the first catalyst consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 45:1, more preferably in the range of from 10:1 to 40:1, more preferably in the range of from 20:1 to 35:1.

It can also be preferred that the zeolitic material comprised in the coating of the first catalyst comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-% based on the weight of the zeolitic material. More preferably from 95 to 100 weight-%, more preferably from 98 to 100 weight-%, more preferably from 99 to 100 weight-%, of the framework structure of said zeolitic material consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 45:1, more preferably in the range of from 10:1 to 40:1, more preferably in the range of from 20:1 to 35:1.

In the context of the present invention, it is preferred that the coating of the first catalyst further comprises a metal oxide, wherein the metal oxide more preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia.

It is preferred that the coating of the first catalyst comprises said metal oxide, more preferably zirconia, in an amount in the range of from 1 to 15 weight-%, more preferably from 2 to 10 weight-%, more preferably from 3 to 8 weight-%, based on the weight of the zeolitic material comprising one or more of copper and iron.

Preferably, as an alternative, the coating of the first catalyst according to (i) comprises a vanadium oxide and not the zeolitic material comprising one or more of copper and iron. It is more preferred that the vanadium oxide is one or more of a vanadium (V) oxide and a vanadium (IV) oxide, wherein the vanadium oxide optionally contains one or more of tungsten, iron and antimony. It is preferred that the vanadium oxide is supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

In the context of the present invention, it is preferred that, from 95 to 100 weight-%, more preferably from 98 to 100 weight-%, more preferably from 99 to 100 weight-%, more preferably from 99.5 to 100 weight-%, of the coating of the first catalyst consist of palladium supported on an oxidic material, a zeolitic material having a framework structure of the type CHA comprising copper, and more preferably a metal oxide as defined in the foregoing.

It is preferred that the substrate of the first catalyst comprises a ceramic or metallic substance.

Preferably the substrate of the first catalyst comprises, more preferably consists of, a ceramic substance, wherein the ceramic substance more preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. It is preferred that the substrate of the first catalyst is a cordierite. Alternatively, the substrate of the first catalyst preferably comprises, more preferably consists of, a metallic substance, wherein the metallic substance preferably comprises, more preferably consists of, oxygen and one or more of iron, chromium, and aluminum.

It is preferred that the substrate of the first catalyst is a monolith, more preferably a honeycomb monolith, more preferably a flow-through honeycomb monolith.

Preferably the substrate of the first catalyst has a substrate length and the coating of the first catalyst is disposed on the substrate over from 95 to 100%, more preferably from 99 to 100%, of the substrate length.

It is preferred that the first catalyst comprises the coating at a loading in the range of from 1 to 6 $g/in^3$, more preferably in the range of from 1.5 to 5 $g/in^3$, more preferably in the range of from 2 to 4 $g/in^3$.

It is preferred that the coating of the first catalyst is the sole coating of the first catalyst.

Preferably at most 0.001 weight-%, more preferably from 0 to 0.0001 weight-%, more preferably from 0 to 0.00001 weight-%, of the coating of the first catalyst consists of platinum, iridium, osmium and rhodium. In other words, it is preferred that the coating of the first catalyst is substantially free of, more preferably free of, platinum, iridium, osmium and rhodium.

Preferably at most 0.1 weight-%, more preferably from 0 to 0.01 weight-%, more preferably from 0 to 0.001 weight-%, more preferably from 0 to 0.0001 weight-%, of the coating of the first catalyst consists of ceria. In other words, it is preferred that the coating of the first catalyst is substantially free of, more preferably free of, ceria.

Second Catalyst

It is preferred that the second catalyst according to (ii) is a selective catalytic reduction catalyst. Indeed, it is more preferably a selective catalytic reduction catalyst for the selective catalytic reduction of NOx.

As to the coating of the second catalyst according to (ii), it is preferred that it comprises a zeolitic material comprising one or more of copper and iron; wherein from 80 to 100 weight-%, more preferably from 90 to 99 weight-%, more preferably from 95 to 98 weight-%, of the coating of the second catalyst according to (ii) consist of the zeolitic material comprising one or more of copper and iron.

Preferably the zeolitic material comprised in the coating of the second catalyst has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA.

Preferably the zeolitic material comprised in the coating of the second catalyst, preferably having a framework structure type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the zeolitic material comprised in the coating of the second catalyst comprises copper, wherein the amount of copper comprised in the zeolitic material, calculated as CuO, is more preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the weight of the zeolitic material.

It is more preferred that the amount of iron comprised in the zeolitic material, calculated as $Fe_2O_3$, is in the range of from 0 to 0.01 weight-%, more preferably in the range of from 0 to weight-%, more preferably in the range of from 0 to 0.0001 weight-%, based on the weight of the zeolitic material.

It is preferred that the zeolitic material comprised in the coating of the second catalyst has a framework structure of the type CHA and comprises copper, more preferably in the amount disclosed above.

Preferably from 95 to 100 weight-%, more preferably from 98 to 100 weight-%, more preferably from 99 to 100 weight-%, of the framework structure of the zeolitic material comprised in the coating of the second catalyst consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 40:1, more preferably in the range of from 10:1 to 40:1, more preferably in the range of from 20:1 to 35:1.

It can also be preferred that the zeolitic material comprised in the coating of the second catalyst comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the weight of the zeolitic material. More preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 40:1, more preferably in the range of from 10:1 to 40:1, more preferably in the range of from 20:1 to 35:1.

In the context of the present invention, it is preferred that the coating of the second catalyst further comprises a metal oxide, wherein the metal oxide more preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia.

Preferably the coating of the second catalyst comprises the metal oxide, more preferably zirconia, in an amount in the range of from 0.5 to 15 weight-%, more preferably from 1 to 8 weight-%, more preferably from 1.5 to 5 weight-%, based on the weight of the zeolitic material comprising one or more of copper and iron.

Preferably from 95 to 100 weight-%, more preferably from 98 to 100 weight-%, more preferably from 99 to 100 weight-%, more preferably from 99.5 to 100 weight-%, of the coating of the second catalyst comprise a zeolitic material comprising one or more of copper and iron, more preferably having a framework structure of the type CHA, and preferably a metal oxide as defined in the foregoing.

It is preferred that the coating of the second catalyst comprises a vanadium oxide, wherein the vanadium oxide is more preferably one or more of a vanadium (V) oxide and a vanadium (IV) oxide, wherein the vanadium oxide optionally contains one or more of tungsten, iron and antimony. Preferably the vanadium oxide is supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

Preferably from 95 to 100 weight-%, more preferably from 98 to 100 weight-%, more preferably from 99 to 100 weight-%, more preferably from 99.5 to 100 weight-% of the coating of the second catalyst consist of a vanadium oxide, preferably supported on an oxidic material as defined in the foregoing.

Preferably from 0 to 0.0001 weight-%, more preferably from 0 to 0.00001 weight-%, more preferably from 0 to 0.000001 weight-%, of the coating of the second catalyst consists of platinum group metal. In other words, it is preferred that the coating of the second catalyst is substantially free, more preferably free, of platinum group metal.

It is preferred that the substrate of the second catalyst comprises a ceramic or metallic substance.

It is preferred that the substrate of the second catalyst comprises, more preferably consists of, a ceramic substance, wherein the ceramic substance more preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. It is more preferred that the substrate of the second catalyst is a cordierite. Alternatively, it is preferred that the substrate of the second catalyst comprises, more preferably consists of, a metallic substance, wherein the metallic substance more preferably comprises, more preferably consists of, oxygen and one or more of iron, chromium, and aluminum.

Preferably the substrate of the second catalyst is a monolith, more preferably a honeycomb monolith, more preferably a flow-through honeycomb monolith.

Preferably the substrate of the second catalyst has a substrate length and the coating of the second catalyst is disposed on the substrate over from 95 to 100%, more preferably from 99 to 100% of the substrate length.

As to the second catalyst, it is preferred that said second catalyst comprises the coating at a loading in the range of from 1 to 6 g/in$^3$, more preferably in the range of from 1.25 to 4 g/in$^3$, more preferably in the range of from 1.5 to 3 g/in$^3$.

As to the coating of the second catalyst, it is preferred that said coating is the sole coating of the second catalyst.

It is preferred that the coating of the first catalyst comprises, more preferably consists of, palladium supported on an oxidic material comprising zirconium, and a zeolitic material having a framework structure of the type CHA and comprising copper, and more preferably a metal oxide as defined in the foregoing, and that the coating of the second catalyst comprises, more preferably consists of, a zeolitic material having a framework structure of the type CHA and comprising copper, and more preferably a metal oxide as defined in the foregoing, wherein at most weight-% of the coating of the second catalyst consists of platinum group metal.

It is preferred that the substrate of the first catalyst comprises, more preferably consists of, a cordierite and the substrate of the second catalyst comprises, more preferably consists of, a cordierite.

Preferably the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other. Alternatively, it is preferred that the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and wherein the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 25 to 75% of the substrate length and the coating of the second catalyst covers from 25 to 75% of the substrate length.

It is more preferred that the coating of the first catalyst covers from 25 to 70%, more preferably from 35 to 65%, more preferably from 45 to 55%, of the substrate length and the coating of the second catalyst covers from 25 to 70%, more preferably from 35 to 65%, more preferably from to 55% of the substrate length. Alternatively, it is more preferred that the coating of the first catalyst covers from 50 to 75%, more preferably from 69 to 75% of the substrate length and the coating of the second catalyst covers from 25 to 50%, more preferably from 25 to 31% of the substrate length.

It is preferred that the coating of the first catalyst and the coating of the second catalyst overlap. Or, it is preferred that there is a gap between the coating of the first catalyst and the coating of the second catalyst.

In the context of the present invention, it is preferred that the substrate of the first catalyst has a substrate length in the range of from 1 to 10 inches, more preferably in the range of from 2 to 8 inches, more preferably in the range of from 14 to 7.5 inches, more preferably in the range of from 5 to 7 inches.

Preferably the substrate of the second catalyst has a substrate length in the range of from 1 to inches, more preferably in the range of from 1.5 to 7 inches, more preferably in the range of from 2 to 5 inches, more preferably in the range of from 2 to 4 inches.

Preferably the length of the first substrate is greater than the length of the second substrate, wherein the ratio of the length of the first substrate relative to the length of the second substrate is more preferably in the range of from 1.1:1 to 4:1, more preferably in the range of from 1.5:1 to 3.5:1, more preferably in the range of from 1.9:1 to 2.1:1.

Preferably the substrate of the first catalyst has a substrate width in the range of from 4 to 17 inches, more preferably in the range of from 7 to 15 inches, more preferably in the range of from 8 to 14 inches, more preferably in the range of from 9 to 13 inches, more preferably in the range of from 9 to 11 inches.

Preferably the substrate of the second catalyst has a substrate width in the range of from 4 to inches, more preferably in the range of from 7 to 18 inches, more preferably in the range of from 9 to 16 inches, more preferably in the range of from 10 to 15 inches, more preferably in the range of from 11 to 14 inches.

It is preferred that the exhaust gas treatment system of the present invention further comprises a first injector for injecting a fluid into the exhaust gas stream exiting the diesel engine, said first injector being located upstream of the first catalyst and downstream of the upstream end of the exhaust gas treatment system. Preferably the fluid is an aqueous urea solution.

It is preferred that the exhaust gas treatment system of the present invention further comprises a second injector for injecting a fluid into the exhaust gas stream exiting the diesel engine, said injector being located upstream of the first catalyst and downstream of the upstream end of the exhaust gas treatment system, wherein the fluid more preferably comprises hydrocarbons.

Third Catalyst

It is preferred that the exhaust gas treatment system of the present invention further comprises
(iii) a third catalyst having an inlet end and an outlet end and comprising a first coating disposed on a substrate and a second coating disposed on the first coating,
wherein the first coating comprises a platinum group metal supported on an oxidic material and optionally further comprises one or more of a vanadium oxide and a zeolitic material comprising one or more of copper and iron,
wherein the second coating comprises one or more of a vanadium oxide and a zeolitic material comprising one or more of copper and iron;
wherein in the exhaust gas treatment system, the third catalyst according to (iii) is located downstream of the second catalyst according to (ii) and wherein the inlet end of the third catalyst is arranged upstream of the outlet end of the third catalyst.

It is preferred that the outlet end of the second catalyst according to (ii) is in fluid communication with the inlet end of the third catalyst according to (iii) and that between the outlet end of the second catalyst according to (ii) and the inlet end of the third catalyst according to (iii), no catalyst for treating the exhaust gas stream exiting the second catalyst is located in the exhaust gas treatment system.

As to the third catalyst according to (iii), it is preferred that said catalyst is an ammonia oxidation catalyst.

Preferably the platinum group metal comprised in the first coating of the third catalyst according to (iii) is one or more of platinum, palladium, rhodium, iridium and osmium, more preferably one or more of platinum, palladium and rhodium, more preferably one or more of platinum and palladium, more preferably platinum.

As to the first coating of the third catalyst, it is preferred that said first coating comprises the platinum group metal, more preferably platinum, at a loading, calculated as elemental metal, more preferably as elemental Pt, in the range of from 0.5 to 30 $g/ft^3$, more preferably in the range of from 1 to 15 $g/ft^3$, more preferably in the range of from 1.5 to 5 $g/ft^3$.

Preferably the oxidic material comprised in the first coating of the third catalyst according to (iii) comprises one or more of titania, zirconia, and alumina, more preferably one or more of titania and zirconia, more preferably titania. It is more preferred that from 85 to 98.5 weight-%, more preferably from 85 to 95 weight-%, of the oxidic material consist of titania, calculated as $TiO_2$.

Preferably the oxidic material comprised in the coating of the third catalyst according to (iii) further comprises one or more of silicon, aluminum, titanium and zirconium, more preferably one or more of silicon and aluminum, more preferably silicon.

Preferably from 95 to 100 weight-%, more preferably from 99 to 100 weight-%, more preferably from 99.5 to 100 weight-%, of the oxidic material comprised in the coating of the third catalyst according to (iii) consist of oxygen, titanium and silicon. More preferably from 1.5 to 15 weight-%, more preferably from 5 to 15 weight-%, of the oxidic material consist of silicon, calculated as $SiO_2$.

It is preferred that from 70 to 100 weight-%, more preferably from 80 to 100 weight-%, more preferably from 90 to 100 weight-%, more preferably from 95 to 100 weight-%, more preferably from 99 to 100 weight-%, of the first coating of the third catalyst according to (iii) consist of the oxidic material.

As an alternative, it is preferred that from 5 to 40 weight-%, more preferably from 7 to 20 weight-%, more preferably from 8 to 15 weight-%, of the first coating of the third catalyst according to (iii) consist of the oxidic material.

Preferably the first coating of the third catalyst according to (iii) comprises the zeolitic material comprising one or more of copper and iron, wherein from 60 to 95 weight-%, more preferably from 80 to 93 weight-%, more preferably from 82 to 92 weight-%, of the first coating of the third catalyst according to (iii) consist of the zeolitic material comprising one or more of copper and iron.

As to the zeolitic material comprised in the first coating of the third catalyst, it is preferred that said zeolitic material has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA.

Preferably the zeolitic material comprised in the first coating of the third catalyst, more preferably having a framework structure type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably the zeolitic material comprised in the first coating of the third catalyst comprises copper, wherein the amount of copper comprised in the zeolitic material, calculated as CuO, is more preferably in the range of from 1 to 12 weight-%, more preferably in the range of from 1.5 to 10 weight-%, more preferably in the range of from 3 to 8 weight-%, more preferably in the range of from 4.5 to 6.5 weight-%, based on the weight of the zeolitic material. Preferably the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the weight of the zeolitic material.

It is preferred that the zeolitic material comprised in the first coating of the third catalyst has a framework structure of the type CHA and comprises copper, more preferably in the amount disclosed above.

Preferably from 95 to 100 weight-%, more preferably from 98 to 100 weight-%, more preferably from 99 to 100 weight-%, of the framework structure of the zeolitic material comprised in the first coating of the third catalyst consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 45:1, more preferably in the range of from 10:1 to 40:1, more preferably in the range of from 15:1 to 1.

It is preferred that the zeolitic material comprised in the first coating of the third catalyst comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-% based on the weight of the zeolitic material. More preferably from 95 to 100 weight-%, more preferably from 98 to 100 weight-%, more preferably from 99 to 100 weight-%, of the framework structure of the zeolitic material consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 45:1, more preferably in the range of from 10:1 to 40:1, more preferably in the range of from 15:1 to 25:1.

As to the first coating of the third catalyst, it is preferred that said coating further comprises a metal oxide, wherein the metal oxide more preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia.

Preferably the first coating of the third catalyst comprises the metal oxide, more preferably zirconia, in an amount in the range of from 1 to 15 weight-%, more preferably from 2 to 10 weight-%, more preferably from 3 to 8 weight-%, based on the weight of the zeolitic material comprising one or more of copper and iron.

Preferably from 95 to 100 weight-%, more preferably from 98 to 100 weight-%, more preferably from 99 to 100 weight-%, more preferably from 99.5 to 100 weight-%, of the first coating of the third catalyst consist of a platinum group metal, more preferably platinum, supported on an oxidic material, and a zeolitic material having a framework structure of the type CHA comprising copper, and preferably a metal oxide as defined in the foregoing.

It is preferred that the first coating of the third catalyst according to (iii) comprises a vanadium oxide and not the zeolitic material comprising one or more of copper and iron, wherein the vanadium oxide is more preferably one or more of a vanadium (V) oxide and a vanadium (IV) oxide, wherein the vanadium oxide optionally contains one or more of tungsten, iron and antimony.

Preferably the vanadium oxide is supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

Preferably from 95 to 100 weight-%, more preferably from 98 to 100 weight-%, more preferably from 99 to 100 weight-%, more preferably from 99.5 to 100 weight-% of the first coating of the third catalyst consist of a platinum group metal, more preferably platinum, supported on an oxidic material, and a vanadium oxide supported on an oxidic material as defined in the foregoing.

As to the second coating of the third catalyst according to (iii), it is preferred that said coating comprises a zeolitic material comprising one or more of copper and iron; wherein from 80 to 100 weight-%, more preferably from 90 to 99 weight-%, more preferably from 95 to 98 weight-%, of the second coating of the third catalyst according to (iii) consist of the zeolitic material comprising one or more of copper and iron.

It is preferred that the zeolitic material comprised in the second coating of the third catalyst has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA.

Preferably the zeolitic material comprised in the second coating of the third catalyst, preferably having a framework structure type CHA, has a mean crystallite size of at least 0.5 micrometer, more preferably in the range of from 0.5 to 1.5 micrometers, more preferably in the range of from 0.6 to 1.0 micrometer, more preferably in the range of from 0.6 to 0.8 micrometer determined via scanning electron microscopy.

It is preferred that the zeolitic material comprised in the second coating of the third catalyst comprises copper, wherein the amount of copper comprised in the zeolitic material, calculated as CuO, is preferably in the range of from 1 to 12 weight-%, more preferably in the range of from 1.5 to 10 weight-%, more preferably in the range of from 3 to 8 weight-%, more preferably in the range of from 4.5 to 6.5 weight-%, based on the weight of the zeolitic material. More preferably the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the weight of the zeolitic material.

It is preferred that the zeolitic material comprised in the second coating of the third catalyst has a framework structure of the type CHA and comprises copper, more preferably in the amount disclosed above.

Preferably from 95 to 100 weight-%, more preferably from 98 to 100 weight-%, more preferably from 99 to 100 weight-%, of the framework structure of the zeolitic material comprised in the second coating of the third catalyst consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to more preferably in the range of from 10:1 to 40:1, more preferably in the range of from 15:1 to 25:1.

It can also be preferred that the zeolitic material comprised in the second coating of the third catalyst comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the weight of the zeolitic material, and that more preferably from 95 to 100 weight-%, more preferably from 98 to 100 weight-%, more preferably from 99 to 100 weight-%, of the framework structure of the zeolitic material consist of Si, Al, O, and optionally one or more of H and P, wherein in the framework structure, the molar ratio of Si to Al, calculated as molar $SiO_2:Al_2O_3$, is more preferably in the range of from 2:1 to 50:1, more preferably in the range of from 4:1 to 45:1, more preferably in the range of from 10:1 to 40:1, more preferably in the range of from 15:1 to 25:1.

As to the second coating of the third catalyst, it is preferred that said coating further comprises a metal oxide, wherein the metal oxide more preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia.

Preferably the second coating of the third catalyst comprises the metal oxide, more preferably zirconia, in an amount in the range of from 1 to 15 weight-%, more preferably from 2 to 10 weight-%, more preferably from 3 to 8 weight-%, based on the weight of the zeolitic material comprising one or more of copper and iron.

Preferably from 95 to 100 weight-%, more preferably from 98 to 100 weight-%, more preferably from 99 to 100 weight-%, more preferably from 99.5 to 100 weight-% of the second coating of the third catalyst consist of a zeolitic material comprising one or more of copper and iron, more preferably having a framework structure of the type CHA, and more preferably a metal oxide as defined in the foregoing.

It is preferred that the second coating of the third catalyst comprises a vanadium oxide, wherein the vanadium oxide is more preferably one or more of a vanadium (V) oxide and a vanadium (IV) oxide, wherein the vanadium oxide optionally contains one or more of tungsten, iron and antimony.

Preferably the vanadium oxide is supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

Preferably from 95 to 100 weight-%, more preferably from 98 to 100 weight-%, more preferably from 99 to 100 weight-%, more preferably from 99.5 to 100 weight-%, of the second coating of the third catalyst consist of a vanadium oxide, more preferably supported on an oxidic material as defined in the foregoing.

Preferably from 0 to 0.0001 weight-%, more preferably from 0 to 0.00001 weight-%, more preferably from 0 to 0.000001 weight-%, of the second coating of the third catalyst consists of platinum group metal. In other words, it is preferred that the second coating of the third catalyst is substantially free, more preferably free, of platinum group metal.

As to the substrate of the third catalyst, it is preferred that it comprises a ceramic or metallic substance.

Preferably the substrate of the third catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. It is more preferred that the substrate of the third catalyst comprises is a cordierite. Alternatively, it is preferred that the substrate of the third catalyst comprises, preferably consists of, a metallic substance, wherein the metallic substance preferably comprises, more preferably consists of, oxygen and one or more of iron, chromium, and aluminum.

Preferably the substrate of the third catalyst is a monolith, more preferably a honeycomb monolith, more preferably a flow-through honeycomb monolith.

Preferably the substrate of the third catalyst has a substrate length and the first coating of the third catalyst is disposed on the substrate over from 95 to 100%, more preferably from 99 to 100% of the substrate length and the second coating of the third catalyst is disposed over from to 100%, more preferably from 99 to 100%, of the substrate length.

It is preferred that the third catalyst comprises the first coating at a loading in the range of from 1 to 6 g/in$^3$, more preferably in the range of from 1.25 to 4 g/in$^3$, more preferably in the range of from 1.5 to 2.5 g/in$^3$.

Preferably the third catalyst comprises the second coating at a loading in the range of from 0.25 to 4 g/in$^3$, more preferably in the range of from 0.5 to 2 g/in$^3$, more preferably in the range of from 0.75 to 1.5 g/in$^3$.

It is preferred that the third catalyst comprises a catalytic loading in the range of from 1.25 to 10 g/in$^3$, more preferably in the range of from 1.75 to 6 g/in$^3$, more preferably in the range of from 2.25 to 4 g/in$^3$.

It is preferred that the third catalyst according to (iii) consists of the first coating and the second coating.

Therefore, the present invention preferably relates to the exhaust gas treatment system defined in the foregoing, wherein the coating of the first catalyst comprises, more preferably consists of, palladium supported on an oxidic material comprising zirconium, and a zeolitic material having a framework structure of the type CHA and comprising copper, and more preferably a metal oxide as defined in the foregoing,
  wherein the coating of the second catalyst comprises, more preferably consists of, a zeolitic material having a framework structure of the type CHA and comprising copper, and more preferably a metal oxide as defined in the foregoing, wherein at most 0.0001 weight-% of the coating of the second catalyst consists of platinum group metal, and
  wherein the first coating of the third catalyst more preferably comprises, more preferably consists of, platinum supported on an oxidic material comprising titania and a zeolitic material having a framework structure of the type CHA and comprising copper, and more preferably a metal oxide as defined in the foregoing, and wherein the second coating of the third catalyst more preferably comprises, more preferably consists of, a zeolitic material having a framework structure of the type CHA and comprising copper, and preferably a metal oxide as defined in the foregoing.

In the context of the present invention, it is preferred that the substrate of the first catalyst comprises, more preferably consists of, a cordierite, the substrate of the second catalyst comprises, more preferably consists of, a cordierite, and the substrate of the third catalyst comprises, more preferably consists of, a cordierite.

Preferably the substrate of the third catalyst has a substrate length in the range of from 1 to 10 inches, more preferably in the range of from 1.5 to 7 inches, more preferably in the range of from 2 to 5 inches, more preferably in the range of from 2 to 4 inches.

It is preferred that the substrate of the first catalyst has a substrate length, wherein the length of the first substrate is greater than the length of the third substrate, wherein the ratio of the length of the first substrate relative to the length of the third substrate is more preferably in the range of from 1.1:1 to 4:1, more preferably in the range of from 1.5:1 to 3.5:1, more preferably in the range of from 1.9:1 to 2.1:1.

Preferably the substrate of the third catalyst has a substrate width in the range of from 4 to 20 inches, more preferably in the range of from 7 to 18 inches, more preferably in the range of from 9 to 16 inches, more preferably in the range of from 10 to 15 inches, more preferably in the range of from 11 to 14 inches.

It is preferred that the exhaust gas treatment system of the present invention further comprises one or more of a particulate filter, a diesel oxidation catalyst and an ammonia oxidation catalyst, wherein the one or more of a particulate filter, a diesel oxidation catalyst and an ammonia oxidation catalyst are located downstream of the second catalyst according to (ii). Alternatively, when the exhaust gas treatment system comprises a third catalyst according to (iii), it is preferred that said one or more of a particulate filter, a diesel oxidation catalyst and an ammonia oxidation catalyst are located downstream of the third catalyst according to (iii).

The present invention further relates to a method for the treatment of an exhaust gas stream exiting a diesel engine comprising
  providing an exhaust gas stream exiting a diesel engine and
  passing said gas through the exhaust gas treatment system according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The system of any one of embodiments 1 to 4", every embodiment in this range is meant to be explicitly disclosed for the skilled person, i.e. the wording of this term is to be understood by the skilled person as being synonymous to "The system of any one of embodiments 1, 2, 3 and 4". Further, it is explicitly noted that the following set of embodiments is not the set of claims determining the extent of protection, but represents a suitably structured part of the description directed to general and preferred aspects of the present invention.

1. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
  (i) a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron;
  (ii) a second catalyst having an inlet end and an outlet end and comprising a coating disposed on a substrate, wherein the coating comprises one or more of a vanadium oxide and a zeolitic material comprising one or more of copper and iron, wherein at most 0.0001 weight-% of the coating of the second catalyst consists of platinum group metal;
  wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;
wherein in the exhaust gas treatment system, the second catalyst according to (ii) is located downstream of the first catalyst according to (i) and wherein the inlet end of the second catalyst is arranged upstream of the outlet end of the second catalyst.

2. The exhaust gas treatment system of embodiment 1, wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

3. The exhaust gas treatment system of embodiment 1 or 2, wherein from 70 to 98 weight-%, preferably from 75 to 95 weight-%, more preferably from 80 to 90 weight-% of the oxidic material comprised in the coating of the first catalyst according to (i) consist of zirconium and oxygen, preferably of zirconia.

4. The exhaust gas treatment system of any one of embodiments 1 to 3, wherein the oxidic material comprised in the coating of the first catalyst according to (i) further comprises one or more of lanthanum, hafnium, aluminum, silicon and titanium, preferably one or more of lanthanum and hafnium, more preferably lanthanum and hafnium.

5. The exhaust gas treatment system of any one of embodiments 1 to 3, wherein from 95 to 100 weight-%, preferably from 99 to 100 weight-%, more preferably from 99.5 to 100 weight-% of the oxidic material comprised in the coating of the first catalyst according to (i) consist of oxygen, zirconium, lanthanum and hafnium;
wherein preferably from 1.5 to 15 weight-%, more preferably from 5 to 15 weight-%, of the oxidic material consist of lanthanum, calculated as $La_2O_3$, and preferably from 0.5 to 15 weight-%, more preferably from 1 to 5 weight-%, of the oxidic material consist of hafnium, calculated as $HfO_2$.

6. The exhaust gas treatment system of any one of embodiments 1 to 5, wherein from 5 to weight-%, preferably from 7 to 20 weight-%, more preferably from 8 to 15 weight-%, of the coating of the first catalyst according to (i) consist of the oxidic material.

7. The exhaust gas treatment system of any one of embodiments 1 to 6, wherein the coating of the first catalyst comprises palladium at a loading, calculated as elemental Pd, in the range of from 1 to 80 $g/ft^3$, preferably in the range of from 5 to 50 $g/ft^3$, more preferably in the range of from 7.5 to 40 $g/ft^3$, more preferably in the range of from 10 to 20 $g/ft^3$.

8. The exhaust gas treatment system of any one of embodiments 1 to 7, wherein the coating of the first catalyst according to (i) comprises the zeolitic material comprising one or more of copper and iron, wherein from 60 to 95 weight-%, preferably from 80 to 93 weight-%, more preferably from 82 to 92 weight-%, of the coating of the first catalyst according to (i) consist of the zeolitic material comprising one or more of copper and iron.

9. The exhaust gas treatment system of any one of embodiments 1 to 8, wherein the zeolitic material comprised in the coating of the first catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

10. The exhaust gas treatment system of any one of embodiments 1 to 9, wherein the zeolitic material comprised in the coating of the first catalyst, preferably having a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

11. The exhaust gas treatment system of any one of embodiments 1 to 10, wherein the zeolitic material comprised in the coating of the first catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the weight of the zeolitic material, wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the weight of the zeolitic material.

12. The exhaust gas treatment system of any one of embodiments 1 to 11, wherein from 95 to 100 weight-%, preferably from 98 to 100 weight-%, more preferably from 99 to 100 weight-% of the framework structure of the zeolitic material of the coating of the first catalyst consist of Si, Al, O, and optionally one or more of H and P, wherein in the framework structure, the molar ratio of Si to Al, calculated as molar $SiO_2$:$Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

13. The exhaust gas treatment system of any one of embodiments 1 to 10, wherein the zeolitic material comprised in the coating of the first catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-% based on the weight of the zeolitic material, and wherein preferably from 95 to 100 weight-%, more preferably from 98 to 100 weight-%, more preferably from 99 to 100 weight-% of the framework structure of the zeolitic material consist of Si, Al, O, and optionally one or more of H and P, wherein in the framework structure, the molar ratio of Si to Al, calculated as molar $SiO_2$:$Al_2O_3$, is preferably in the range of from 2:1 to 50:1, more preferably in the range of from 4:1 to more preferably in the range of from 10:1 to 40:1, more preferably in the range of from 20:1 to 35:1.

14. The exhaust gas treatment system of any one of embodiments 1 to 13, wherein the coating of the first catalyst further comprises a metal oxide, wherein the metal oxide preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia; wherein the coating of the first catalyst more preferably comprises the metal oxide in an amount in the range of from 1 to 15 weight-%, more preferably from 2 to 10 weight-%, more preferably from 3 to 8 weight-%, based on the weight of the zeolitic material comprising one or more of copper and iron.

15. The exhaust gas treatment system of any one of embodiments 1 to 7, wherein the coating of the first catalyst according to (i) comprises a vanadium oxide and not the zeolitic material comprising one or more of copper and iron,
wherein the vanadium oxide is preferably one or more of a vanadium (V) oxide and a vanadium (IV) oxide, wherein the vanadium oxide optionally contains one or more of tungsten, iron and antimony.

16. The exhaust gas treatment system of embodiment 15, wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

17. The exhaust gas treatment system of any one of embodiments 1 to 14, wherein from 95 to 100 weight-%, preferably from 98 to 100 weight-%, more preferably from 99 to 100 weight-%, more preferably from 99.5 to 100 weight-% of the coating of the first catalyst consist of palladium supported on an oxidic material, and a zeolitic material having a framework structure of the type CHA comprising copper, and preferably a metal oxide as defined in embodiment 14.

18. The exhaust gas treatment system of any one of embodiments 1 to 17, wherein the substrate of the first catalyst comprises a ceramic or metallic substance.

19. The exhaust gas treatment system of any one of embodiments 1 to 18, wherein the substrate of the first catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titanic, more preferably one or more of a silicon carbide and a cordierite, more preferably a cordierite, or
wherein the substrate of the first catalyst comprises, preferably consists of, a metallic substance, wherein the metallic substance preferably comprises, more preferably consists of, oxygen and one or more of iron, chromium, and aluminum.

20. The exhaust gas treatment system of any one of embodiments 1 to 19, wherein the substrate of the first catalyst is a monolith, preferably a honeycomb monolith, more preferably a flow-through honeycomb monolith.

21. The exhaust gas treatment system of any one of embodiments 1 to 20, wherein the substrate of the first catalyst has a substrate length and wherein the coating of the first catalyst is disposed on the substrate over from 95 to 100%, more preferably from 99 to 100%, of the substrate length.

22. The exhaust gas treatment system of any one of embodiments 1 to 21, wherein the first catalyst comprises the coating at a loading in the range of from 1 to 6 g/in$^3$, preferably in the range of from 1.5 to 5 g/in$^3$, more preferably in the range of from 2 to 4 g/in$^3$.

23. The exhaust gas treatment system of any one of embodiments 1 to 22, wherein the coating of the first catalyst is the sole coating of the first catalyst.

24. The exhaust gas treatment system of any one of embodiments 1 to 23, wherein at most 0.001 weight-%, preferably from 0 to 0.0001 weight-%, more preferably from 0 to 0.00001 weight-%, of the coating of the first catalyst consists of platinum, iridium, osmium and rhodium.

25. The exhaust gas treatment system of any one of embodiments 1 to 25, wherein the second catalyst according to (ii) is a selective catalytic reduction catalyst.

26. The exhaust gas treatment system of any one of embodiments 1 to 25, wherein the coating of the second catalyst according to (ii) comprises a zeolitic material comprising one or more of copper and iron; wherein from 80 to 100 weight-%, preferably from 90 to 99 weight-%, more preferably from 95 to 98 weight-%, of the coating of the second catalyst according to (ii) consist of the zeolitic material comprising one or more of copper and iron.

27. The exhaust gas treatment system of any one of embodiments 1 to 26, wherein the zeolitic material comprised in the coating of the second catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

28. The exhaust gas treatment system of any one of embodiments 1 to 27, wherein the zeolitic material comprised in the coating of the second catalyst, preferably having a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

29. The exhaust gas treatment system of any one of embodiments 1 to 28, wherein the zeolitic material comprised in the coating of the second catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the weight of the zeolitic material; wherein the amount of iron comprised in the zeolitic material, calculated as Fe$_2$O$_3$, is more preferably in the range of from 0 to 0.01 weight-%, more preferably in the range of from 0 to 0.001 weight-%, more preferably in the range of from 0 to 0.0001 weight-%, based on the weight of the zeolitic material.

30. The exhaust gas treatment system of any one of embodiments 1 to 29, wherein from 95 to 100 weight-%, preferably from 98 to 100 weight-%, more preferably from 99 to 100 weight-% of the framework structure of the zeolitic material comprised in the coating of the second catalyst consist of Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from to 35:1.

31. The exhaust gas treatment system of any one of embodiments 1 to 28, wherein the zeolitic material comprised in the coating of the second catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to more preferably in the range of from 10:1 to 40:1, more preferably in the range of from 20:1 to 35:1.

32. The exhaust gas treatment system of any one of embodiments 1 to 31, wherein the coating of the second catalyst further comprises a metal oxide, wherein the metal oxide preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia;
wherein the coating of the second catalyst more preferably comprises the metal oxide in an amount in the range of from 0.5 to 15 weight-%, more preferably from 1 to 8 weight-%, more preferably from 1.5 to 5 weight-%, based on the weight of the zeolitic material comprising one or more of copper and iron.

33. The exhaust gas treatment system of any one of embodiments 1 to 32, wherein from 95 to 100 weight-%, preferably from 98 to 100 weight-%, more preferably from 99 to 100 weight-%, more preferably from 99.5 to 100 weight-%, of the coating of the second catalyst comprise a zeolitic material comprising one or more of copper and iron, preferably having a framework structure of the type CHA, and preferably a metal oxide as defined in embodiment 32.

34. The exhaust gas treatment system of any one of embodiments 1 to 25, wherein the coating of the second catalyst comprises a vanadium oxide, wherein the vanadium oxide is preferably one or more of a vanadium (V) oxide and a vanadium (IV) oxide, wherein the vanadium oxide optionally contains one or more of tungsten, iron and antimony.

35. The exhaust gas treatment system of embodiment 34, wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

36. The exhaust gas treatment system of embodiment 34 or 35, wherein from 95 to 100 weight-%, preferably from 98 to 100 weight-%, more preferably from 99 to 100 weight-%, more preferably from 99.5 to 100 weight-% of the coating of the second catalyst consist of a vanadium oxide, preferably supported on an oxidic material as defined in embodiment 35.

35. The exhaust gas treatment system of any one of embodiments 1 to 34, wherein from 0 to 0.0001 weight-%, preferably from 0 to 0.00001 weight-%, more preferably from 0 to 0.000001 weight-%, of the coating of the second catalyst consists of platinum group metal.

36. The exhaust gas treatment system of any one of embodiments 1 to 35, wherein the substrate of the second catalyst comprises a ceramic or metallic substance.

37. The exhaust gas treatment system of any one of embodiments 1 to 36, wherein the substrate of the second catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite; or
wherein the substrate of the second catalyst comprises, preferably consists of, a metallic substance, wherein the metallic substance preferably comprises, more preferably consists of, oxygen and one or more of iron, chromium, and aluminum.

38. The exhaust gas treatment system of any one of embodiments 1 to 37, wherein the substrate of the second catalyst is a monolith, preferably a honeycomb monolith, more preferably a flow-through honeycomb monolith.

39. The exhaust gas treatment system of any one of embodiments 1 to 38, wherein the substrate of the second catalyst has a substrate length and wherein the coating of the second catalyst is disposed on the substrate over from 95 to 100%, preferably from 99 to 100% of the substrate length.

40. The exhaust gas treatment system of any one of embodiments 1 to 39, wherein the second catalyst comprises the coating at a loading in the range of from 1 to 6 $g/in^3$, preferably in the range of from 1.25 to 4 $g/in^3$, more preferably in the range of from 1.5 to 3 $g/in^3$.

41. The exhaust gas treatment system of any one of embodiments 1 to 40, wherein the coating of the second catalyst is the sole coating of the second catalyst.

42. The exhaust gas treatment system of any one of embodiments 1 to 41, wherein the coating of the first catalyst comprises, preferably consists of, palladium supported on an oxidic material comprising zirconium, and a zeolitic material having a framework structure of the type CHA and comprising copper, and preferably a metal oxide as defined in embodiment 14, and
wherein the coating of the second catalyst comprises, preferably consists of, a zeolitic material having a framework structure of the type CHA and comprising copper, and preferably a metal oxide as defined in embodiment 32, wherein at most 0.0001 weight-% of the coating of the second catalyst consists of platinum group metal.
43. The exhaust gas treatment system of any one of embodiments 1 to 42, wherein the substrate of the first catalyst comprises, preferably consists of, a cordierite and the substrate of the second catalyst comprises, preferably consists of, a cordierite.
44. The exhaust gas treatment system of any one of embodiments 1 to 43, wherein the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other.
45. The exhaust gas treatment system of any one of embodiments 1 to 43, wherein the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and wherein the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 25 to 75% of the substrate length and the coating of the second catalyst covers from 25 to % of the substrate length.
46. The exhaust gas treatment system of embodiment 45, wherein the coating of the first catalyst covers from 25 to 70%, preferably from 35 to 65%, more preferably from 45 to 55%, of the substrate length and the coating of the second catalyst covers from 25 to 70%, preferably from 35 to 65%, more preferably from 45 to 55% of the substrate length.
47. The exhaust gas treatment system of embodiment 45, wherein the coating of the first catalyst covers from 50 to 75%, preferably from 69 to 75% of the substrate length and the coating of the second catalyst covers from 25 to 50%, preferably from 25 to 31% of the substrate length.
48. The exhaust gas treatment system of any one of embodiments 45 to 47, wherein the coating of the first catalyst and the coating of the second catalyst overlap.
49. The exhaust gas treatment system of any one of embodiments 45 to 47, wherein there is a gap between the coating of the first catalyst and the coating of the second catalyst.
50. The exhaust gas treatment system of any one of embodiments 1 to 49, wherein the substrate of the first catalyst has a substrate length in the range of from 1 to 10 inches, preferably in the range of from 2 to 8 inches, more preferably in the range of from 14 to 7.5 inches, more preferably in the range of from 5 to 7 inches.
51. The exhaust gas treatment system of any one of embodiments 1 to 50, wherein the substrate of the second catalyst has a substrate length in the range of from 1 to 10 inches, preferably in the range of from 1.5 to 7 inches, more preferably in the range of from 2 to 5 inches, more preferably in the range of from 2 to 4 inches.
52. The exhaust gas treatment system of embodiment 50 or 51, wherein the length of the first substrate is greater than the length of the second substrate, wherein the ratio of the length of the first substrate relative to the length of the second substrate is preferably in the range of from 1.1:1 to 4:1, preferably in the range of from 1.5:1 to 3.5:1, more preferably in the range of from 1.9:1 to 2.1:1.
53. The exhaust gas treatment system of any one of embodiments 1 to 52, wherein the substrate of the first catalyst has a substrate width in the range of from 4 to 17 inches, preferably in the range of from 7 to 15 inches, more preferably in the range of from 8 to 14 inches, more preferably in the range of from 9 to 13 inches, more preferably in the range of from 9 to 11 inches.
54. The exhaust gas treatment system of any one of embodiments 1 to 53, wherein the substrate of the second catalyst has a substrate width in the range of from 4 to 20 inches, preferably in the range of from 7 to 18 inches, more preferably in the range of from 9 to 16 inches, more preferably in the range of from 10 to 15 inches, more preferably in the range of from 11 to 14 inches.
55. The exhaust gas treatment system of any one of embodiments 1 to 54, further comprising a first injector for injecting a fluid into the exhaust gas stream exiting the diesel engine, said first injector being located upstream of the first catalyst and downstream of the upstream end of the exhaust gas treatment system.
56. The exhaust gas treatment system of embodiment 55, wherein the fluid is an aqueous urea solution.
57. The exhaust gas treatment system of any one of embodiments 1 to 56, further comprising a second injector for injecting a fluid into the exhaust gas stream exiting the diesel engine, said injector being located upstream of the first catalyst and downstream of the upstream end of the exhaust gas treatment system, wherein the fluid preferably comprises hydrocarbons.
58. The exhaust gas treatment system of any one of embodiments 1 to 57, further comprising
  (iii) a third catalyst having an inlet end and an outlet end and comprising a first coating disposed on a substrate and a second coating disposed on the first coating, wherein the first coating comprises a platinum group metal supported on an oxidic material and optionally further comprises one or more of a vanadium oxide and a zeolitic material comprising one or more of copper and iron,
  wherein the second coating comprises one or more of a vanadium oxide and a zeolitic material comprising one or more of copper and iron;
  wherein in the exhaust gas treatment system, the third catalyst according to (iii) is located downstream of the second catalyst according to (ii) and wherein the inlet end of the third catalyst is arranged upstream of the outlet end of the third catalyst.
59. The exhaust gas treatment system of embodiment 58, wherein the outlet end of the second catalyst according to (ii) is in fluid communication with the inlet end of the third catalyst according to (iii) and wherein between the outlet end of the second catalyst according to (ii) and the inlet end of the third catalyst according to (iii), no catalyst for treating the exhaust gas stream exiting the second catalyst is located in the exhaust gas treatment system.

60. The exhaust gas treatment system of embodiment 58 or 59, wherein the third catalyst according to (iii) is an ammonia oxidation catalyst.
61. The exhaust gas treatment system of any one of embodiments 58 to 60, wherein the platinum group metal comprised in the first coating of the third catalyst according to (iii) is one or more of platinum, palladium, rhodium, iridium and osmium, preferably one or more of platinum, palladium and rhodium, more preferably one or more of platinum and palladium, more preferably platinum.
62. The exhaust gas treatment system of any one of embodiments 58 to 61, wherein the first coating of the third catalyst comprises the platinum group metal, preferably platinum, at a loading, calculated as elemental metal, preferably as elemental Pt, in the range of from 0.5 to 30 g/ft$^3$, preferably in the range of from 1 to 15 g/ft$^3$, more preferably in the range of from 1.5 to 5 g/ft$^3$.
63. The exhaust gas treatment system of any one of embodiments 58 to 62, wherein the oxidic material comprised in the first coating of the third catalyst according to (iii) comprises one or more of titania, zirconia, and alumina, preferably one or more of titania and zirconia, more preferably titania;
wherein more preferably from 85 to 98.5 weight-%, more preferably from 85 to 95 weight-%, of the oxidic material consist of titania, calculated as TiO$_2$.
64. The exhaust gas treatment system of any one of embodiments 58 to 63, wherein the oxidic material comprised in the coating of the third catalyst according to (iii) further comprises one or more of silicon, aluminum, titanium and zirconium, preferably one or more of silicon and aluminum, more preferably silicon.
65. The exhaust gas treatment system of any one of embodiments 58 to 64, wherein from 95 to 100 weight-%, preferably from 99 to 100 weight-%, more preferably from 99.5 to 100 weight-%, of the oxidic material comprised in the coating of the third catalyst according to (iii) consist of oxygen, titanium and silicon;
wherein preferably from 1.5 to 15 weight-%, more preferably from 5 to 15 weight-%, of the oxidic material consist of silicon, calculated as SiO$_2$.
66. The exhaust gas treatment system of any one of embodiments 58 to 65, wherein from 5 to 40 weight-%, preferably from 7 to 20 weight-%, more preferably from 8 to 15 weight-%, of the first coating of the third catalyst according to (iii) consist of the oxidic material, or wherein from 70 to 100 weight-%, preferably from 80 to 100 weight-%, more preferably from 90 to 100 weight-%, more preferably from 95 to 100 weight-%, more preferably from 99 to 100 weight-%, of the first coating of the third catalyst according to (iii) consist of the oxidic material.
67. The exhaust gas treatment system of any one of embodiments 58 to 66, wherein the first coating of the third catalyst according to (iii) comprises the zeolitic material comprising one or more of copper and iron, wherein from 60 to 95 weight-%, preferably from 80 to 93 weight-%, more preferably from 82 to 92 weight-%, of the first coating of the third catalyst according to (iii) consist of the zeolitic material comprising one or more of copper and iron.
68. The exhaust gas treatment system of any one of embodiments 58 to 67, wherein the zeolitic material comprised in the first coating of the third catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.
69. The exhaust gas treatment system of any one of embodiments 58 to 68, wherein the zeolitic material comprised in the first coating of the third catalyst, preferably having a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.
70. The exhaust gas treatment system of any one of embodiment 58 to 69, wherein the zeolitic material comprised in the first coating of the third catalyst comprises copper, wherein the amount of copper comprised in the zeolitic material, calculated as CuO, is preferably in the range of from 1 to 12 weight-%, more preferably in the range of from 1.5 to 10 weight-%, more preferably in the range of from 3 to 8 weight-%, more preferably in the range of from 4.5 to 6.5 weight-%, based on the weight of the zeolitic material, wherein the amount of iron comprised in the zeolitic material, calculated as Fe$_2$O$_3$, is more preferably in the range of from 0 to 0.01 weight-%, more preferably in the range of from 0 to 0.001 weight-%, more preferably in the range of from 0 to 0.0001 weight-%, based on the weight of the zeolitic material.
71. The exhaust gas treatment system of any one of embodiments 58 to 70, wherein from 95 to 100 weight-%, preferably from 98 to 100 weight-%, more preferably from 99 to 100 weight-%, of the framework structure of the zeolitic material comprised in the first coating of the third catalyst consist of Si, Al, O, and optionally one or more of H and P, wherein in the framework structure, the molar ratio of Si to Al, calculated as molar SiO$_2$:Al$_2$O$_3$, is preferably in the range of from 2:1 to 50:1, more preferably in the range of from 4:1 to 45:1, more preferably in the range of from 10:1 to 40:1, more preferably in the range of from 15:1 to 25:1.
72. The exhaust gas treatment system of any one of embodiments 58 to 69, wherein the zeolitic material comprised in the first coating of the third catalyst comprises iron, wherein the amount of iron comprised in the zeolitic material, calculated as Fe$_2$O$_3$, is preferably in the range of from 0.1 to 10.0 weight-%, more preferably in the range of from 1.0 to 7.0 weight-%, more preferably in the range of from 2.5 to 5.5 weight-% based on the weight of the zeolitic material, and wherein preferably from 95 to 100 weight-%, more preferably from 98 to 100 weight-%, more preferably from 99 to 100 weight-%, of the framework structure of the zeolitic material consist of Si, Al, O, and optionally one or more of H and P, wherein in the framework structure, the molar ratio of Si to Al, calculated as molar SiO$_2$:Al$_2$O$_3$, is preferably in the range of from 2:1 to 50:1, more preferably in the range of from 4:1 to more preferably in the range of from 10:1 to 40:1, more preferably in the range of from 15:1 to 25:1.
73. The exhaust gas treatment system of any one of embodiments 58 to 72, wherein the first coating of the third catalyst further comprises a metal oxide, wherein the metal oxide preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia;
wherein the first coating of the third catalyst more preferably comprises the metal oxide in an amount in the range of from 1 to 15 weight-%, more preferably from 2 to 10 weight-%, more preferably from 3 to 8 weight-%, based on the weight of the zeolitic material comprising one or more of copper and iron.

74. The exhaust gas treatment system of any one of embodiments 58 to 73, wherein from 95 to 100 weight-%, preferably from 98 to 100 weight-%, more preferably from 99 to 100 weight-%, more preferably from 99.5 to 100 weight-%, of the first coating of the third catalyst consist of a platinum group metal, preferably platinum, supported on an oxidic material, and a zeolitic material having a framework structure of the type CHA comprising copper, and preferably a metal oxide as defined in embodiment 73.

75. The exhaust gas treatment system of any one of embodiments 58 to 66, wherein the first coating of the third catalyst according to (iii) comprises a vanadium oxide and not the zeolitic material comprising one or more of copper and iron,
wherein the vanadium oxide is preferably one or more of a vanadium (V) oxide and a vanadium (IV) oxide, wherein the vanadium oxide optionally contains one or more of tungsten, iron and antimony.

76. The exhaust gas treatment system of embodiment 75, wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

77. The exhaust gas treatment system of embodiment 75 or 76, wherein from 95 to 100 weight-%, preferably from 98 to 100 weight-%, more preferably from 99 to 100 weight-%, more preferably from 99.5 to 100 weight-% of the first coating of the third catalyst consist of a platinum group metal, preferably platinum, supported on an oxidic material, and a vanadium oxide supported on an oxidic material as defined in embodiment 76.

78. The exhaust gas treatment system of any one of embodiments 58 to 77, wherein the second coating of the third catalyst according to (iii) comprises a zeolitic material comprising one or more of copper and iron; wherein from 80 to 100 weight-%, preferably from 90 to 99 weight-%, more preferably from 95 to 98 weight-%, of the second coating of the third catalyst according to (iii) consist of the zeolitic material comprising one or more of copper and iron.

79. The exhaust gas treatment system of any one of embodiments 58 to 78, wherein the zeolitic material comprised in the second coating of the third catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

80. The exhaust gas treatment system of any one of embodiments 58 to 79, wherein the zeolitic material comprised in the second coating of the third catalyst, preferably having a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

81. The exhaust gas treatment system of any one of embodiments 58 to 80, wherein the zeolitic material comprised in the second coating of the third catalyst comprises copper, wherein the amount of copper comprised in the zeolitic material, calculated as CuO, is preferably in the range of from 1 to 12 weight-%, more preferably in the range of from 1.5 to 10 weight-%, more preferably in the range of from 3 to 8 weight-%, more preferably in the range of from 4.5 to 6.5 weight-%, based on the weight of the zeolitic material, wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the weight of the zeolitic material.

82. The exhaust gas treatment system of any one of embodiments 58 to 81, wherein from 95 to 100 weight-%, preferably from 98 to 100 weight-%, more preferably from 99 to 100 weight-%, of the framework structure of the zeolitic material comprised in the second coating of the third catalyst consist of Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 15:1 to 25:1.

83. The exhaust gas treatment system of any one of embodiments 58 to 82, wherein the zeolitic material comprised in the second coating of the third catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the weight of the zeolitic material, and wherein preferably from 95 to 100 weight-%, more preferably from 98 to 100 weight-%, more preferably from 99 to 100 weight-%, of the framework structure of the zeolitic material consist of Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 15:1 to 25:1.

84. The exhaust gas treatment system of any one of embodiments 58 to 83, wherein the second coating of the third catalyst further comprises a metal oxide, wherein the metal oxide preferably comprises one or more of zirconia, alumina, titania, silica, and a mixed oxide comprising two or more of Zr, Al, Ti, and Si, more preferably comprises one or more of alumina and zirconia, more preferably comprises, more preferably is, zirconia;

wherein the second coating of the third catalyst more preferably comprises the metal oxide in an amount in the range of from 1 to 15 weight-%, more preferably from 2 to 10 weight-%, more preferably from 3 to 8 weight-%, based on the weight of the zeolitic material comprising one or more of copper and iron.

85. The exhaust gas treatment system of any one of embodiments 58 to 84, wherein from 95 to 100 weight-%, preferably from 98 to 100 weight-%, more preferably from 99 to 100 weight-%, more preferably from 99.5 to 100 weight-% of the second coating of the third catalyst consist of a zeolitic material comprising one or more of copper and iron, preferably having a framework structure of the type CHA, and preferably a metal oxide as defined in embodiment 84.

86. The exhaust gas treatment system of any one of embodiments 58 to 77, wherein the second coating of the third catalyst comprises a vanadium oxide, wherein the vanadium oxide is preferably one or more of a vanadium (V) oxide and a vanadium (IV) oxide, wherein the vanadium oxide optionally contains one or more of tungsten, iron and antimony.

87. The exhaust gas treatment system of embodiment 86, wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

88. The exhaust gas treatment system of embodiment 86 or 87, wherein from 95 to 100 weight-%, preferably from 98 to 100 weight-%, more preferably from 99 to 100 weight-%, more preferably from 99.5 to 100 weight-%, of the second coating of the third catalyst consist of a vanadium oxide, preferably supported on an oxidic material as defined in embodiment 87.

89. The exhaust gas treatment system of any one of embodiments 58 to 88, wherein from 0 to weight-%, preferably from 0 to 0.00001 weight-%, more preferably from 0 to weight-%, of the second coating of the third catalyst consists of platinum group metal.

90. The exhaust gas treatment system of any one of embodiments 58 to 89, wherein the substrate of the third catalyst comprises a ceramic or metallic substance.

91. The exhaust gas treatment system of any one of embodiments 58 to 90, wherein the substrate of the third catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite, or wherein the substrate of the third catalyst comprises, preferably consists of, a metallic substance, wherein the metallic substance preferably comprises, more preferably consists of, oxygen and one or more of iron, chromium, and aluminum.

92. The exhaust gas treatment system of any one of embodiments 58 to 91, wherein the substrate of the third catalyst is a monolith, preferably a honeycomb monolith, more preferably a flow-through honeycomb monolith.

93. The exhaust gas treatment system of any one of embodiments 58 to 92, wherein the substrate of the third catalyst has a substrate length and wherein the first coating of the third catalyst is disposed on the substrate over from 95 to 100%, more preferably from 99 to 100% of the substrate length and the second coating of the third catalyst is disposed over from 95 to 100%, more preferably from 99 to 100%, of the substrate length.

94. The exhaust gas treatment system of any one of embodiments 58 to 93, wherein the third catalyst comprises the first coating at a loading in the range of from 1 to 6 g/in$^3$, preferably in the range of from 1.25 to 4 g/in$^3$, more preferably in the range of from 1.5 to 2.5 g/in$^3$.

95. The exhaust gas treatment system of any one of embodiments 58 to 94, wherein the third catalyst comprises the second coating at a loading in the range of from 0.25 to 4 g/in$^3$, preferably in the range of from 0.5 to 2 g/in$^3$, more preferably in the range of from 0.75 to 1.5 g/in$^3$.

96. The exhaust gas treatment system of any one of embodiments 58 to 95, wherein the third catalyst comprises a catalytic loading in the range of from 1.25 to 10 g/in$^3$, preferably in the range of from 1.75 to 6 g/in$^3$, more preferably in the range of from 2.25 to 4 g/in$^3$.

97. The exhaust gas treatment system of any one of embodiments 58 to 96, wherein the third catalyst according to (iii) consists of the first coating and the second coating.

98. The exhaust gas treatment system of any one of embodiments 58 to 97, wherein the coating of the first catalyst comprises, preferably consists of, palladium supported on an oxidic material comprising zirconium, and a zeolitic material having a framework structure of the type CHA and comprising copper, and preferably a metal oxide as defined in embodiment 14, wherein the coating of the second catalyst comprises, preferably consists of, a zeolitic material having a framework structure of the type CHA and comprising copper, and preferably a metal oxide as defined in embodiment 32, wherein at most 0.0001 weight-% of the coating of the second catalyst consists of platinum group metal, and wherein the first coating of the third catalyst preferably comprises, more preferably consists of, platinum supported on an oxidic material comprising titania and a zeolitic material having a framework structure of the type CHA and comprising copper, and preferably a metal oxide as defined in embodiment 73, and wherein the second coating of the third catalyst preferably comprises, more preferably consists of, a zeolitic material having a framework structure of the type CHA and comprising copper, and preferably a metal oxide as defined in embodiment 84.

99. The exhaust gas treatment system of any one of embodiments 58 to 98, wherein the substrate of the first catalyst comprises, preferably consists of, a cordierite, the substrate of the second catalyst comprises, preferably consists of, a cordierite, and the substrate of the third catalyst comprises, preferably consists of, a cordierite.

100. The exhaust gas treatment system of any one of embodiments 58 to 99, wherein the substrate of the third catalyst has a substrate length in the range of from 1 to 10 inches, preferably in the range of from 1.5 to 7 inches, more preferably in the range of from 2 to 5 inches, more preferably in the range of from 2 to 4 inches.

101. The exhaust gas treatment system of embodiment 100, wherein the substrate of the first catalyst has a substrate length, wherein the length of the first substrate is greater than the length of the third substrate, wherein the ratio of the length of the first substrate relative to the length of the third substrate is preferably in the range of from 1.1:1 to 4:1, preferably in the range of from 1.5:1 to 3.5:1, more preferably in the range of from 1.9:1 to 2.1:1.

102. The exhaust gas treatment system of any one of embodiments 58 to 101, wherein the substrate of the third catalyst has a substrate width in the range of from 4 to 20 inches, preferably in the range of from 7 to 18 inches, more preferably in the range of from 9 to 16 inches, more preferably in the range of from 10 to 15 inches, more preferably in the range of from 11 to 14 inches.

103. The exhaust gas treatment system of any one of embodiments 1 to 102, further comprising one or more of a particulate filter, a diesel oxidation catalyst and an ammonia oxidation catalyst, wherein the one or more of a particulate filter, a diesel oxidation catalyst and an ammonia oxidation catalyst are located downstream of the second catalyst according to (ii) or downstream the third catalyst according to (iii) as defined in any one of embodiments 58 to 102, when said third catalyst is comprised in the system.

104. A method for the treatment of an exhaust gas stream exiting a diesel engine comprising providing an exhaust gas stream exiting a diesel engine and passing said gas through the exhaust gas treatment system according to any one of embodiments 1 to 103.

In the context of the present invention, the term "loading of a given component/coating" (in $g/in^3$ or $g/ft^3$) refers to the mass of said component/coating per volume of the substrate, wherein the volume of the substrate is the volume which is defined by the cross-section of the substrate times the axial length of the substrate over which said component/coating is present. For example, if reference is made to the loading of a first coating extending over x % of the axial length of the substrate and having a loading of X $g/in^3$, said loading would refer to X gram of the first coating per x % of the volume (in $in^3$) of the entire substrate.

In the context of the present invention, it is noted that when the amount of copper and/or iron comprised in the zeolitic material is defined in weight-% based on the weight of the zeolitic material, this means that it is based on the weight of the zeolitic material, namely the zeolitic material comprising the respective copper and/or iron.

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls. For example, in the context of the present invention, it is preferred that the first coating of the third catalyst is disposed on the surface of the internal walls of a substrate, more preferably a flow-through substrate.

In the context of the present invention, the term "consists of" with regard to the weight-% of one or more components indicates the weight-% amount of said component(s) based on 100 weight-% of the entity in question. For example, the wording "wherein from 0 to 0.0001 weight-% of the first coating consists of platinum group metal" indicates that among the 100 weight-% of the components of which said coating consists of, from 0 to 0.0001 weight-% is platinum group metal(s).

The present invention is further illustrated by the following reference examples, comparative examples and examples.

EXAMPLES

Reference Example 1 Determination of Dv10, Dv50 and Dv90 Values

The particle size distributions were determined by a static light scattering method using Sympatec HELOS equipment, wherein the optical concentration of the sample was in the range of from 5 to 10%.

Reference Example 2 Measurement of the BET Specific Surface Area

The BET specific surface area was determined according to DIN 66131 or DIN ISO 9277 using liquid nitrogen.

Reference Example 3 General Coating Method

In order to coat a flow-through substrate with one or more coats, the flow-through substrate was immersed vertically in a given mixture for a specific length of the substrate, to fill the substrate with a charge of the mixture. In this manner, the mixture contacted the walls of the substrate. The substrate was left in the mixture for a specific period of time, usually for 1-10 seconds. Vacuum was applied to draw the mixture into the substrate. The substrate was then removed from the mixture. The substrate was rotated about its axis such that the immersed side now points up and a high pressure of air forces the charged mixture through the substrate.

Reference Example 4 Preparation of a Multi-Functional Catalyst (Mixed—Single Coating)

An incipient wetness impregnation of Pd onto a zirconium based oxidic support (88 weight-% of $ZrO_2$ with 10 weight-% $La_2O_3$ and 2 weight-% $HfO_2$, having a BET specific surface area of 67 m$^2$/g, a Dv50 of 3 micrometers and a Dv90 of 16 micrometers). Firstly, the available pore volume of the oxidic support was determined and, based on this value, a diluted palladium salt solution with a volume equal to the available pore volume was made. The diluted solution was then added dropwise to the Zr-based oxidic support over 30 minutes under constant stirring resulting in a moist material. The resulting material was then calcined in an oven at 590° C. and allowed to cool. After calcination, the resulting powder was mixed with distilled water to form an aqueous mixture with 40% solids and the pH was adjusted to 3.75 using an organic acid. At this point, the slurry was milled until the particles of the mixture had a Dv90 of 10 micrometers.

Separately, a Cu-CHA zeolitic material (Cu: 3.25 weight-%, calculated as CuO, based on the weight of the Cu-CHA, CHA having a Dv90 of 25 micrometers, a SiO$_2$:Al$_2$O$_3$ of 31, and a BET specific surface area of about 625 m$^2$/g) was added to deionized water, forming a mixture. Further, a soluble zirconium solution (30 weight-% ZrO$_2$) was added as a binder to the mixture comprising water and Cu-CHA. The pH was adjusted to 7. The final mixture solid content was 43 weight-%.

At this point, the Pd-impregnated ZrO$_2$ mixture was mixed into the Cu-CHA mixture and the pH was again adjusted to 7. The final mixture was ready for disposal on a honeycomb flow-through monolith cordierite substrate (diameter: 26.67 cm (10.5 inches)×length: 15.24 cm (6 inches) cylindrically shaped substrate with 400/(2.54)$^2$ cells per square centimeter and 0.10 millimeter (4 mil) wall thickness). The substrate was coated with the final mixture according to the coating method defined in Reference Example 3 herein. To achieve the targeted washcoat loading of 3.0 g/in$^3$, the substrate was coated twice along its entire length, once from the inlet end of the substrate to the outlet end and once from the outlet end of the substrate to the inlet end, with a drying and calcination steps after each coating step. To dry a coated substrate, the substrate was placed in an oven at 90° C. for about 30 minutes. After drying, the coated substrate was calcined for 30 minutes at 590° C. The final loading of the coating in the catalyst after calcination was of 3.0 g/in$^3$, including 2.56 g/in$^3$ Cu-CHA, 0.3 g/in$^3$ of zirconia/HfO$_3$/La$_2$O$_3$, 0.13 g/in$^3$ of zirconia (binder) and a Pd loading of 15 g/ft$^3$.

Reference Example 5 Preparation of a Selective Catalytic Reduction (SCR) Catalyst An aqueous zirconyl-acetate solution was diluted in water. The amount of zirconyl-acetate was calculated such that the loading of zirconia in the catalyst after calcination, calculated as ZrO$_2$, was 0.06 g/in$^3$. To this, a Cu-CHA zeolite, prepared according to inventive example 2 of U.S. Pat. No. 8,293,199 B2, column 15, lines 26 to 52 except that the zeolite was spray-dried, were added. The amount of Cu-CHA was calculated such that the loading of Cu-CHA in the catalyst after calcination was 2.04 g/in$^3$. The resulting slurry was then milled until the resulting Dv90 determined as described in Reference Example 1 herein was 10 micrometers.

The final slurry was then disposed over the full length of an uncoated honeycomb flow-through cordierite monolith substrate (diameter: 31.75 cm (12.5 inches)×length: 7.62 cm (3 inches) cylindrically shaped substrate with 400/(2.54)$^2$ cells per square centimeter and 0.1 millimeter (4 mil) wall thickness). Afterwards, the coated substrate was dried at 120° C. for 10 minutes and at 160° C. for 30 minutes and was then calcined at 450° C. for 30 minutes. The washcoat loading after calcination was 2.1 g/in$^3$.

Reference Example 6 Preparation of an Ammonia Oxidation (AMOX) Catalyst

First Coating (Bottom Coating):

To a Si-doped titania powder (10 wt % SiO$_2$, BET specific surface area of 200 m$^2$/g, a Dv90 of 20 micrometers) was added a platinum ammine solution. After calcination at 590° C. the final Pt/Si-titania had a Pt content of 0.46 weight-% based on the weight of Si-titania. This material was added to water and the slurry was milled until the resulting Dv90 was 10 micrometers, as described in Reference Example 1. To an aqueous slurry of Cu-CHA zeolitic material (5.1 weight-% CuO and a SiO$_2$:Al$_2$O$_3$ molar ratio of 18) was added a zirconyl-acetate solution to achieve 5 weight-% ZrO$_2$ after calcination based on the weight of the zeolitic material. To this Cu-CHA slurry, the Pt-containing slurry was added and stirred, creating the final slurry. The final slurry was then disposed over the full length of an uncoated honeycomb flow-through cordierite monolith substrate (diameter: 31.75 cm (12.5 inches)×length: 7.62 cm (3 inches) cylindrically shaped substrate with 400/(2.54)$^2$ cells per square centimeter and 0.1 millimeter (4 mil) wall thickness), from the inlet side of the substrate towards the outlet side, using the coating method described in Reference Example 3, forming the first (bottom) coating. Afterwards, the coated substrate was dried and calcined. The loading of the first coating, after calcination was about 2 g/in$^3$ with a Cu-CHA loading of 1.67 g/in$^3$, a ZrO$_2$ loading of 0.08 g/in$^3$, a Si-titania loading of 0.25 g/in$^3$ and a PGM loading of 2 g/ft$^3$.

Second Coating (Top Coating):

To an aqueous slurry of Cu-CHA zeolitic material (5.1 weight-% CuO and a SiO$_2$:Al$_2$O$_3$ molar ratio of 18) was added a zirconyl-acetate solution to achieve 5 weight-% ZrO$_2$ after calcination based on the weight of the zeolitic material. The slurry was then disposed over the full length of the honeycomb cordierite monolith substrate, coated with the first coating, from the inlet side of the substrate towards the outlet side and covering the first coating using the coating method described in Reference Example 3. Afterwards, the coated substrate was dried and calcined. The loading of this second coating after calcination was 1.0 g/in$^3$.

The final catalytic loading (bottom+top coatings) in the catalyst after calcination was about 3 g/in$^3$.

Reference Example 7 Preparation of a Multi-Functional Catalyst (Layered)

Second Coating (Bottom Coating):

An aqueous zirconyl-acetate solution was diluted in water. The amount of zirconyl-acetate was calculated such that the loading of zirconia in the catalyst after calcination, calculated as ZrO$_2$, was 0.08 g/in$^3$. To this, a Cu-CHA zeolite, prepared according to inventive example 2 of U.S. Pat. No. 8,293,199 B2, column 15, lines 26 to 52 except that the zeolite was spray-dried, were added. The amount of Cu-CHA was calculated such that the loading of Cu-CHA in the catalyst after calcination was 2.6 g/in$^3$. The resulting slurry was then milled until the resulting Dv90 determined as described in Reference Example 1 herein was 10 micrometers.

The final slurry was then disposed over the full length of an uncoated honeycomb cordierite monolith substrate (diameter: 26.67 cm (10.5 inches)×length: 15.24 cm (6 inches)

cylindrically shaped substrate with $400/(2.54)^2$ cells per square centimeter and 0.10 millimeter (4 mil) wall thickness). Afterwards, the coated substrate was dried at 120° C. for 10 minutes and at 160° C. for 30 minutes and was then calcined at 450° C. for 30 minutes. The washcoat loading after calcination was 2.7 g/in$^3$.

First Coating (Top Coating):

An incipient wetness impregnation of Pd onto a zirconium based oxidic support (88 weight-% of $ZrO_2$ with 10 weight-% $La_2O_3$ and 2 weight-% $HfO_2$, having a BET specific surface area of 67 m$^2$/g, a Dv50 of 3 micrometers and a Dv90 of 16 micrometers). Firstly, the available pore volume of the given oxidic support was determined and, based on this value, a diluted palladium salt solution with a volume equal to the available pore volume was made. A palladium nitrate solution (palladium content, calculated as elemental Pd, of 17.56 weight-%) was mixed with distilled water until the solid content was reduced to 6.1%. The diluted solution was then added dropwise to the Zr-based oxidic support over 30 minutes under constant stirring resulting in a solid material with about 25 weight-% of water. The resulting material was then calcined in an oven at 590° C. and allowed to cool. After calcination, the resulting powder was mixed together with distilled water to form a mixture in which the final solid content was 41 weight-%, based on the weight of the mixture, and the pH of the aqueous phase of the mixture was set to 3.75 using an organic acid. At this point, the slurry was milled until the particles of the mixture had a Dv90 of 10 micrometers.

After milling, a zirconium hydroxide solution (a zirconia content, calculated as $ZrO_2$, of 50 weight-%) and a zirconium acetate solution (a zirconia content, calculated as $ZrO_2$, of 30 weight-%) were added to the mixture. The amount of ZrOH was calculated such that it represented 1/35 of the amount of the Al-based oxidic support. The amount of ZrOAc was calculated such that it represented 1/10 of the amount of the Al-based oxidic support. The obtained final mixture had a solid content decreased to 38 weight-% based on the weight of said final mixture. At this point, the mixture was ready for disposal over the substrate already coated with the bottom coating. The substrate coated with the bottom coating was coated once with said final mixture over the entire length of the substrate, according to the coating method as defined in Reference Example 3 herein. Drying conditions were the same as for the bottom coating and the coated substrate was calcined in band-calciner oven with varying temperature stages, including about 30 minutes at 450° C. The final loading of the top coating in the catalyst after calcination was 0.3 g/in$^3$, including 0.26 g/in$^3$ of Zr-based oxidic support, 0.03 g/in$^3$ of zirconia (from ZrOH and ZrOAc) and a Pd loading of 15 g/ft$^3$.

The final catalytic loading (bottom+top coatings) in the catalyst after calcination was about 3 g/in$^3$.

Comparative Example 1 Preparation of a System for the Treatment of Exhaust Gas not According to the Present Invention The system of Comparative Example 1 was prepared by combining three catalysts, namely a multifunctional layered catalyst according to Reference Example 7 (catalyst A), a selective catalytic reduction catalyst according to Reference Example 5 (catalyst B) and an ammonia oxidation catalyst according to Reference Example 6 (catalyst C). The catalyst A is the first catalyst of the system and located upstream of catalyst B, the catalyst B is located downstream of the catalyst A and upstream of the catalyst C and the catalyst C is located downstream of the catalyst B.

Example 1 Preparation of a System for the Treatment of Exhaust Gas According to the Present Invention The system of Example 1 was prepared by combining three catalysts, namely a multifunctional mixed catalyst according to Reference Example 4 (catalyst A), a selective catalytic reduction catalyst according to Reference Example 5 (catalyst B) and an ammonia oxidation catalyst according to Reference Example 6 (catalyst C). The catalyst A is the first catalyst of the system and located upstream of catalyst B, the catalyst B is located downstream of the catalyst A and upstream of the catalyst C and the catalyst C is located downstream of the catalyst B.

Comparative Example 2 Preparation of a System for the Treatment of Exhaust Gas not According to the Present Invention The system of Comparative Example 2 was prepared by combining three catalysts, namely a multifunctional mixed catalyst according to Reference Example 4 (catalyst A), an ammonia oxidation catalyst according to Reference Example 6 (catalyst B) and an ammonia oxidation catalyst according to Reference Example 6 (catalyst C). The catalyst A is the first catalyst of the system and located upstream of catalyst B, the catalyst B is located downstream of the catalyst A and upstream of the catalyst C and the catalyst C is located downstream of the catalyst B.

Comparative Example 3 Preparation of a System for the Treatment of Exhaust Gas not According to the Present Invention The system of Comparative Example 3 was prepared by combining three catalysts, namely a multifunctional layered catalyst according to Reference Example 7 (catalyst A), a multifunctional layered catalyst according to Reference Example 7 (catalyst B) and an ammonia oxidation catalyst according to Reference Example 6 (catalyst C). The catalyst A is the first catalyst of the system and located upstream of catalyst B, the catalyst B is located downstream of the catalyst A and upstream of the catalyst C and the catalyst C is located downstream of the catalyst B.

TABLE 1

| | Exhaust gas treatment systems | | |
| --- | --- | --- | --- |
| | Catalyst A | Catalyst B | Catalyst C |
| Comparative Ex. 1 | Ref. Example 7 | Ref. Example 5 | Ref. Example 6 |
| Example 1 | Ref. Example 4 | Ref. Example 5 | Ref. Example 6 |
| Comparative Ex. 2 | Ref. Example 4 | Ref. Example 6 | Ref. Example 6 |
| Comparative Ex. 3 | Ref. Example 7 | Ref. Example 7 | Ref. Example 6 |

Example 2 Testing of the Systems of Comparative Examples 1-3 and of Example 1—NOx Conversion and $N_2O$ Emissions The NOx conversion and the $N_2O$ emissions were measured at high temperature at the entrance of the systems, namely at 390° C. The tests have been made on a EU VI 13 L engine under steady state conditions.

TABLE 2

| Measurement conditions | | |
|---|---|---|
| Temperature (inlet T of Cat. A-T °C.) | Exhaust mass flow (kg/hr) | Engine out NOx (ppm) |
| 390 | 445 | 600 |

As may be taken from FIG. 2, the exhaust gas treatment system of Example 1 permits to obtain a NOx conversion of 85% at the outlet end of the catalyst A, of 100% at the outlet end of the catalyst B and of 100% at the outlet end of the catalyst C of the two systems. In contrast, the exhaust gas treatment system of Comparative Examples 1 to 3 exhibits lower or similar NOx conversion at the outlet end of the catalyst A, namely of about 82% or 85%, and lower NOx conversion at the outlet end of the catalyst B, namely of about less than 99% and less than 95%. Further, as may be taken from FIG. 3, the lowest nitrous oxide emissions are obtained with the system of Example 1 according to the present invention which comprises a multifunctional mixed catalyst as the first catalyst (A) and a downstream SCR catalyst free of platinum group metal (B). Therefore, this example demonstrates that the systems according to the present invention permits to improve NOx conversions while decreasing the nitrous oxide emissions compared to other systems which uses a layered multifunctional catalyst as the first catalyst of the system and/or a second catalyst comprising platinum group metal. The comparative examples illustrates the prior art, such as WO 2018/224651 A1.

Example 4 Testing of the Systems of Comparative Examples 1-3 and of Example 1—NOx Conversion and $N_2O$ Emissions The NOx conversion and the $N_2O$ emissions were measured over a transient HDD US FTP legal cycle with temperatures at the entrance of the systems ranging from 155 to 277° C. over the cycle. The tests have been made on a EU VI 13 L with engine out NOx emissions of 150 g over the FTP and urea dosing was performed using a NOx follow dosing strategy with an ANR of 1.1. Three FTPs were run in sequence with a cold soak in between the cycles. The results of the third FTP are reported to ensure stable readings and eliminate ammonia storage influences over the Cu-zeolite.

As may be taken from FIGS. 4 and 5, the exhaust gas treatment system of Example 1 presents the highest NOx conversion at the outlet ends of the catalysts A, B and C, namely of about 56%, about 86% and about 88%, as well as the lowest $N_2O$ emissions at the aforementioned outlet ends of the catalysts of the systems compared to the systems of Comparative Examples 1 to 3. Therefore, this example demonstrates that the systems according to the present invention permits to improve NOx conversions while decreasing the nitrous oxide emissions compared to other systems which uses a layered multifunctional catalyst as the first catalyst of the system under steady state conditions as well as transient state conditions.

CITED LITERATURE

WO 2018/224651 A1

Figure 1:
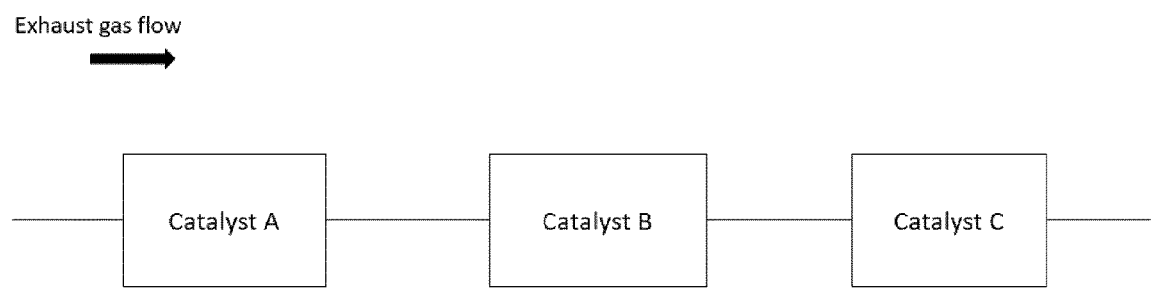
FIG. 1 is a schematic depiction of a system comprising three catalysts, catalyst A, catalyst B and catalyst C. The appended figure is not necessarily drawn to scale.
Figure 2:
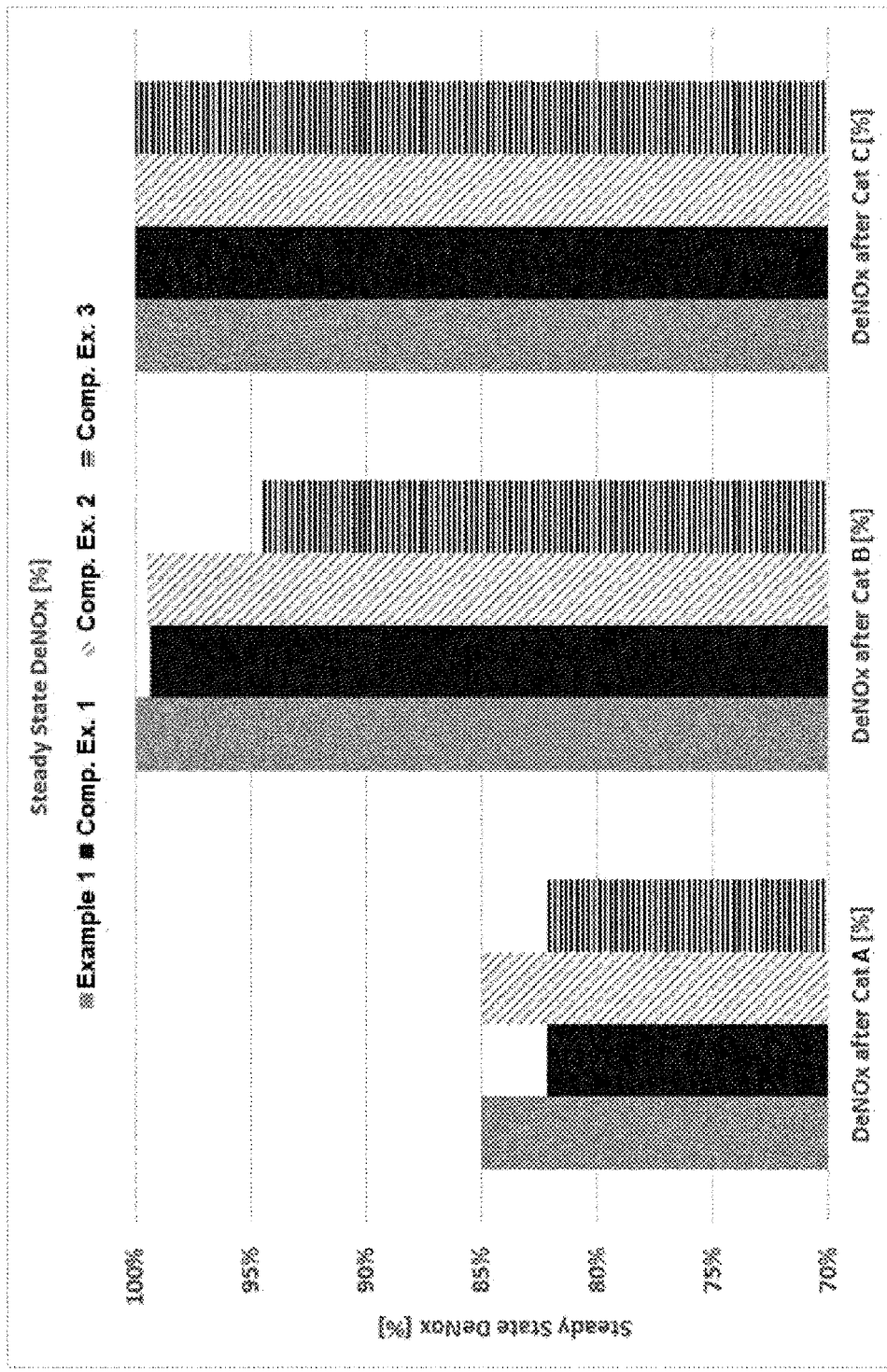
FIG. 2 shows the NOx conversion measured downstream of catalysts A, B and C for the systems of Example 1 and Comparative Examples 1 to 3 under steady state conditions.
Figure 3:
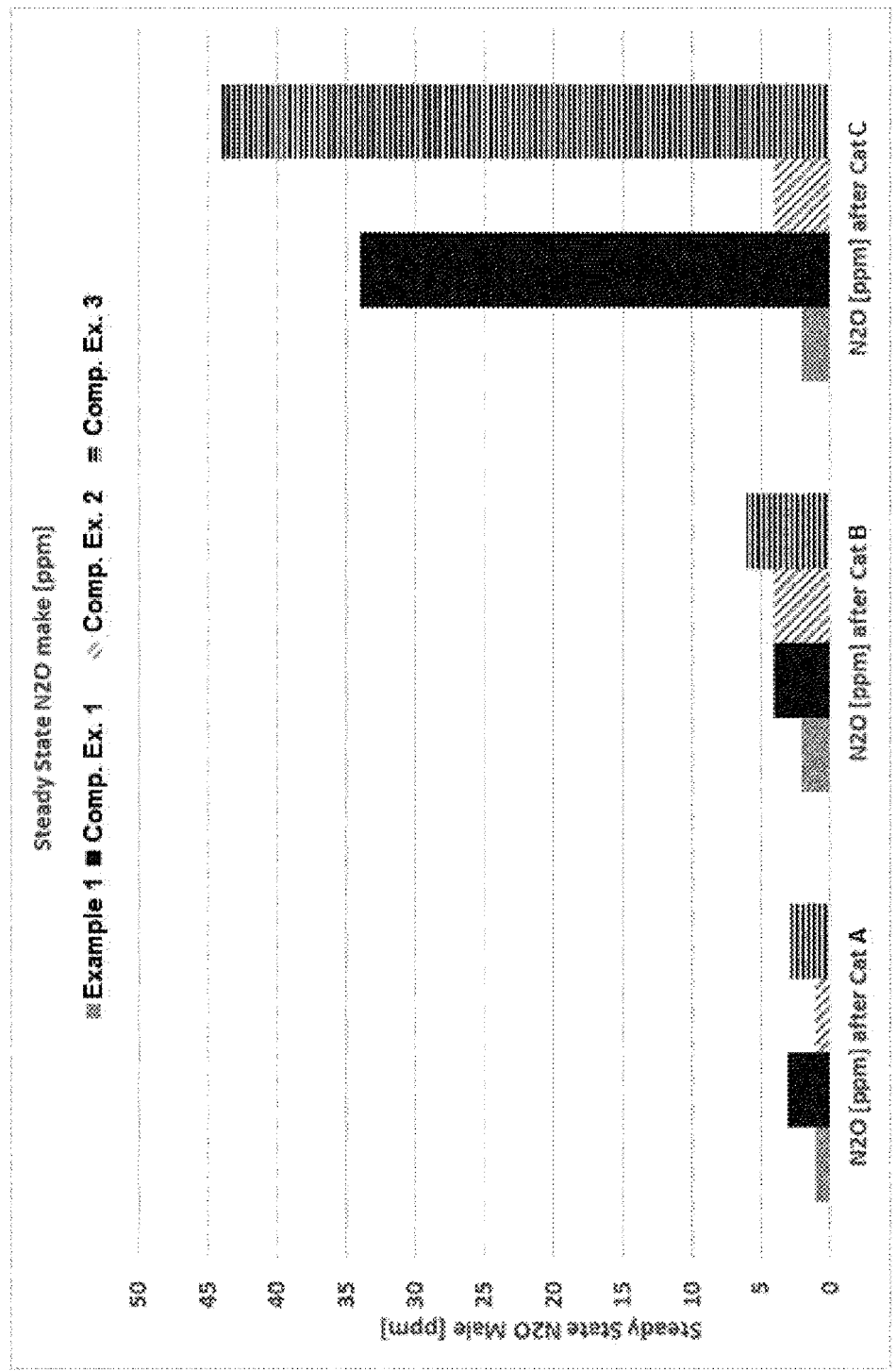
FIG. 3 shows the $N_2O$ emissions measured downstream of catalysts A, B and C for the systems of Example 1 and Comparative Examples 1 to 3 under steady state conditions.
Figure 4:
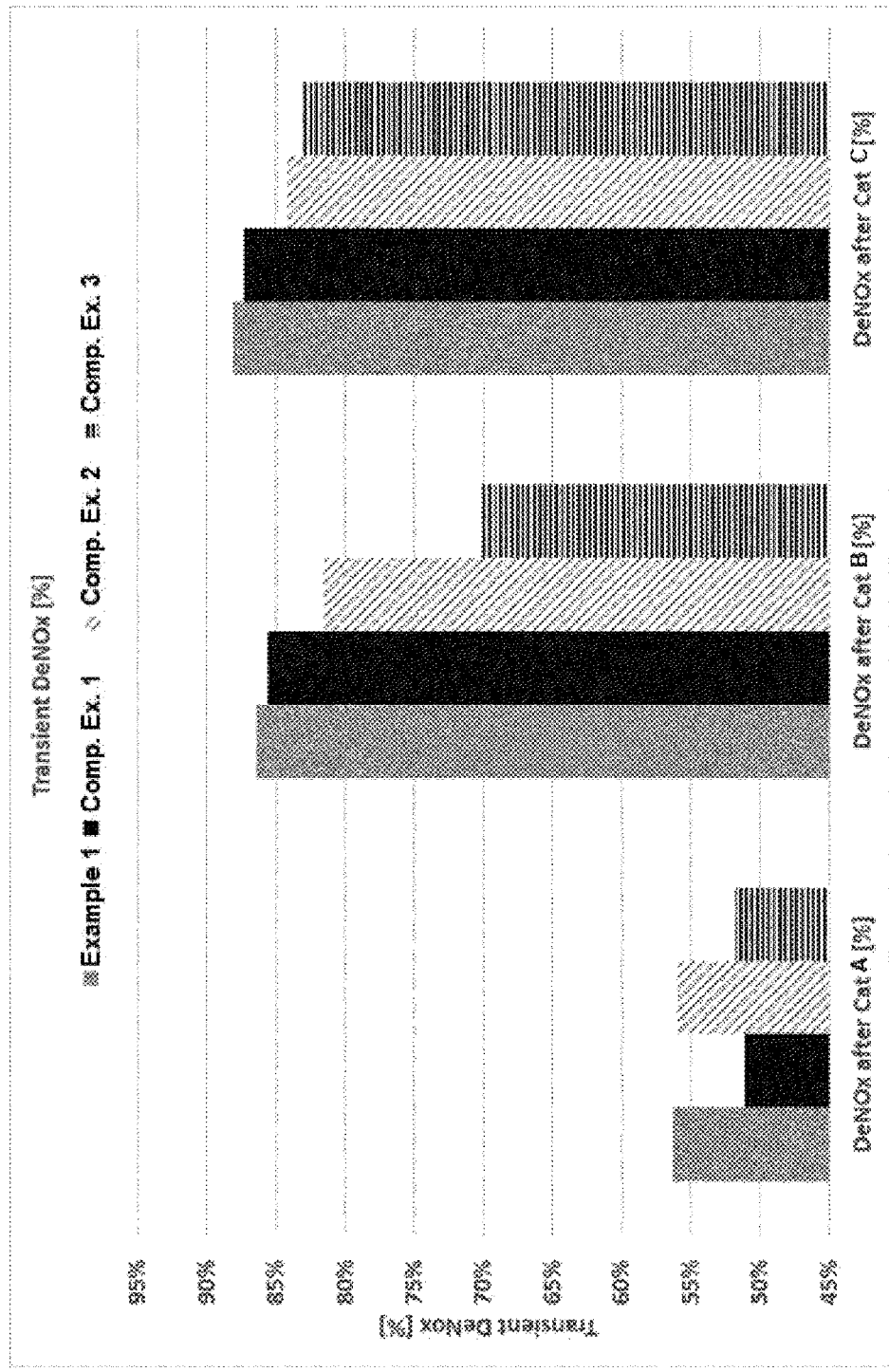
FIG. 4 shows the NOx conversion measured downstream of catalysts A, B and C for the systems of Example 1 and Comparative Examples 1 to 3 under transient test conditions.
Figure 5:
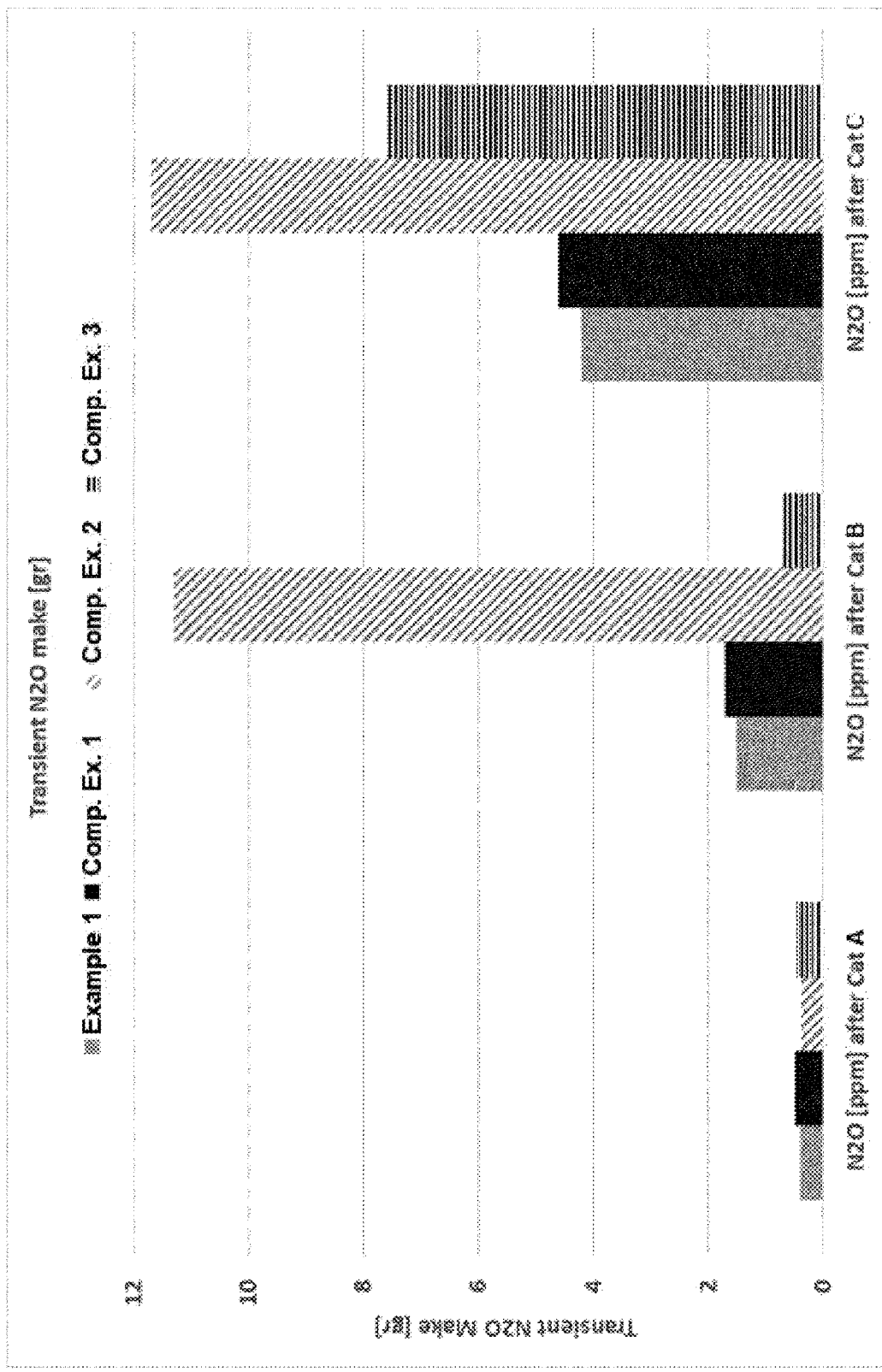
FIG. 5 shows the $N_2O$ emissions measured downstream of catalysts A, B and C for the systems of Example 1 and Comparative Examples 1 to 3 under transient test conditions.

The invention claimed is:

1. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises:
   (i) a first catalyst having an inlet end and an outlet end and comprising a coating disposed on a first substrate, wherein the coating comprises palladium supported on an oxidic material comprising zirconium and further comprises one or more of a vanadium oxide and a first zeolitic material comprising one or more of copper and iron;
   (ii) a second catalyst having an inlet end and an outlet end and comprising a coating disposed on a second substrate, wherein the coating comprises one or more of a vanadium oxide and a second zeolitic material comprising one or more of copper and iron, wherein at most 0.0001 weight-% of the coating of the second catalyst consists of platinum group metal;
   wherein the first catalyst according to (i) is located downstream of the upstream end of the exhaust gas treatment system and wherein the inlet end of the first catalyst is arranged upstream of the outlet end of the first catalyst;
   wherein in the exhaust gas treatment system, the second catalyst according to (ii) is located downstream of the first catalyst according to (i) and wherein the inlet end of the second catalyst is arranged upstream of the outlet end of the second catalyst.

2. The exhaust gas treatment system of claim 1, wherein from 70 to 98 weight-%, preferably from 75 to 95 weight-%, more preferably from 80 to 90 weight-% of the oxidic material comprised in the coating of the first catalyst according to (i) consist of zirconium and oxygen, preferably of zirconia.

3. The exhaust gas treatment system of claim 1, wherein the oxidic material comprised in the coating of the first catalyst according to (i) further comprises one or more of lanthanum, hafnium, aluminum, silicon and titanium, preferably one or more of lanthanum and hafnium, more preferably lanthanum and hafnium.

4. The exhaust gas treatment system of claim 1, wherein from 5 to 40 weight-%, preferably from 7 to 20 weight-%, more preferably from 8 to 15 weight-%, of the coating of the first catalyst according to (i) consist of the oxidic material.

5. The exhaust gas treatment system of claim 1, wherein the first zeolitic material comprises one or more of copper and iron, wherein from 60 to 95 weight-%, preferably from 80 to 93 weight-%, more preferably from 82 to 92 weight-%, of the coating of the first catalyst according to (i) consist of the zeolitic material comprising one or more of copper and iron.

6. The exhaust gas treatment system of claim 1, wherein the first zeolitic material comprised in the coating of the first catalyst has a framework structure of AEI, GME, CHA, MFI, BEA, FAU, MOR or mixtures of two or more thereof, preferably a framework structure of AEI, CHA, BEA or mixtures of two or more thereof, more preferably a framework structure of CHA or AEI, more preferably a framework structure of CHA.

7. The exhaust gas treatment system of claim 1, wherein the second zeolitic material comprises one or more of copper and iron; wherein from 80 to 100 weight-%, preferably from 90 to 99 weight-%, more preferably from 95 to 98 weight-%, of the coating of the second catalyst according to (ii) consist of the second zeolitic material comprising one or more of copper and iron.

8. The exhaust gas treatment system of claim 1, wherein the second zeolitic material comprised in the coating of the second catalyst has a framework structure of AEI, GME, CHA, MFI, BEA, FAU, MOR or mixtures of two or more thereof, preferably a framework structure of AEI, CHA, BEA or mixtures of two or more thereof, more preferably a framework structure of CHA or AEI, more preferably a framework structure of CHA.

9. The exhaust gas treatment system of claim 1, wherein the coating of the first catalyst comprises, preferably consists of, palladium supported on an oxidic material comprising zirconium, and the first zeolitic material having a framework structure of CHA and comprising copper, and preferably a metal oxide, and wherein the coating of the second catalyst comprises, preferably consists of, the first zeolitic material having a framework structure of CHA and comprising copper, and preferably a metal oxide, wherein at most 0.0001 weight-% of the coating of the second catalyst consists of platinum group metal.

10. The exhaust gas treatment system of claim 1, further comprising a first injector for injecting a fluid into the exhaust gas stream exiting the diesel engine, said first injector being located upstream of the first catalyst and downstream of the upstream end of the exhaust gas treatment system.

11. The exhaust gas treatment system of claim 1, further comprising
(iii) a third catalyst having an inlet end and an outlet end and comprising a first coating disposed on a third substrate and a second coating disposed on the first coating,
wherein the first coating comprises a platinum group metal supported on an oxidic material and optionally further comprises one or more of a vanadium oxide and a third zeolitic material comprising one or more of copper and iron,
wherein the second coating comprises one or more of a vanadium oxide and a fourth zeolitic material comprising one or more of copper and iron;
wherein in the exhaust gas treatment system, the third catalyst according to (iii) is located downstream of the second catalyst according to (ii) and wherein the inlet end of the third catalyst is arranged upstream of the outlet end of the third catalyst.

12. The exhaust gas treatment system of claim 11, wherein the platinum group metal comprised in the first coating of the third catalyst according to (iii) is one or more of platinum, palladium, rhodium, iridium and osmium, preferably one or more of platinum, palladium and rhodium, more preferably one or more of platinum and palladium, more preferably platinum.

13. The exhaust gas treatment system of claim 11, wherein the oxidic material comprised in the first coating of the third catalyst according to (iii) comprises one or more of titania, zirconia, and alumina, preferably one or more of titania and zirconia, more preferably titania;
wherein more preferably from 85 to 98.5 weight-%, more preferably from 85 to 95 weight-%, of the oxidic material consist of titania, calculated as $TiO_2$.

14. The exhaust gas treatment system of claim 1, wherein from 5 to 40 weight-%, preferably from 7 to 20 weight-%, more preferably from 8 to 15 weight-%, of the first coating of the third catalyst according to (iii) consist of the oxidic material, or wherein from 70 to 100 weight-%, preferably from 80 to 100 weight-%, more preferably from 90 to 100 weight-%, more preferably from 95 to 100 weight-%, more preferably from 99 to 100 weight-%, of the first coating of the third catalyst according to (iii) consist of the oxidic material.

15. A method for the treatment of an exhaust gas stream exiting a diesel engine comprising
providing an exhaust gas stream exiting a diesel engine and
passing said gas through the exhaust gas treatment system according claim 1.

* * * * *